United States Patent [19]

Syron-Townson et al.

[11] Patent Number: 5,070,442

[45] Date of Patent: Dec. 3, 1991

[54] COMPUTERIZED DOOR LOCKING AND MONITORING SYSTEM USING POWER-LINE CARRIER COMPONENTS

[76] Inventors: Ann T. Syron-Townson; James A. Townson, both of 398 Wales Ct., Marco Island, Fla. 33937

[21] Appl. No.: 450,432

[22] Filed: Dec. 14, 1989

[51] Int. Cl.[5] .............................................. G06F 15/20

[52] U.S. Cl. ............................... 364/146; 340/310 A; 340/825.31; 364/400

[58] Field of Search ........ 364/146, 400, 130, 138–145; 340/310 R, 310 A, 542, 545, 546, 547, 538, 825.31, 825.32; 361/170–172, 182–184, 189–193; 70/277–283, 262–265

[56] References Cited

U.S. PATENT DOCUMENTS

| | | | |
|---|---|---|---|
| 3,978,468 | 8/1976 | Bond et al. | 340/310 A X |
| 4,367,455 | 1/1983 | Fried | 340/310 A |
| 4,744,021 | 5/1988 | Kristy | 364/400 X |
| 4,845,490 | 7/1989 | Ward et al. | 340/825.31 |
| 4,912,461 | 3/1990 | Cenzano, Jr. et al. | 340/310 A X |

*Primary Examiner*—Joseph Ruggiero

*Attorney, Agent, or Firm*—Donald L. Wood

[57] ABSTRACT

A method of locking, unlocking and monitoring doors using a computer and a computer software program, electro-locking devices, power-line carrier components and existing AC wiring from the door sites to the computer is provided.

The computer program changes the status of each door according to predetermined schedule and displays the locked/unlocked/ajar status of each door as well as the event change (Push bar/key/fire alarm).

Exits are fitted with electro-door locks with sensor capabilities and are monitored from the computer via power line carrier components. At each exit site, a receiver receives commands from the computer and changes the locking status while a transmitter at the door site reports every changed status back to the computer. A microprocessor at each door site can control the doors and operate via battery back-up in a power failure or when communication from the computer program is interrupted. A transmitter at the fire alarm panel causes all doors to unlock if the fire alarm is activated.

7 Claims, 6 Drawing Sheets

WIRING DIAGRAM OF COMPONENTS AT DOOR SITE

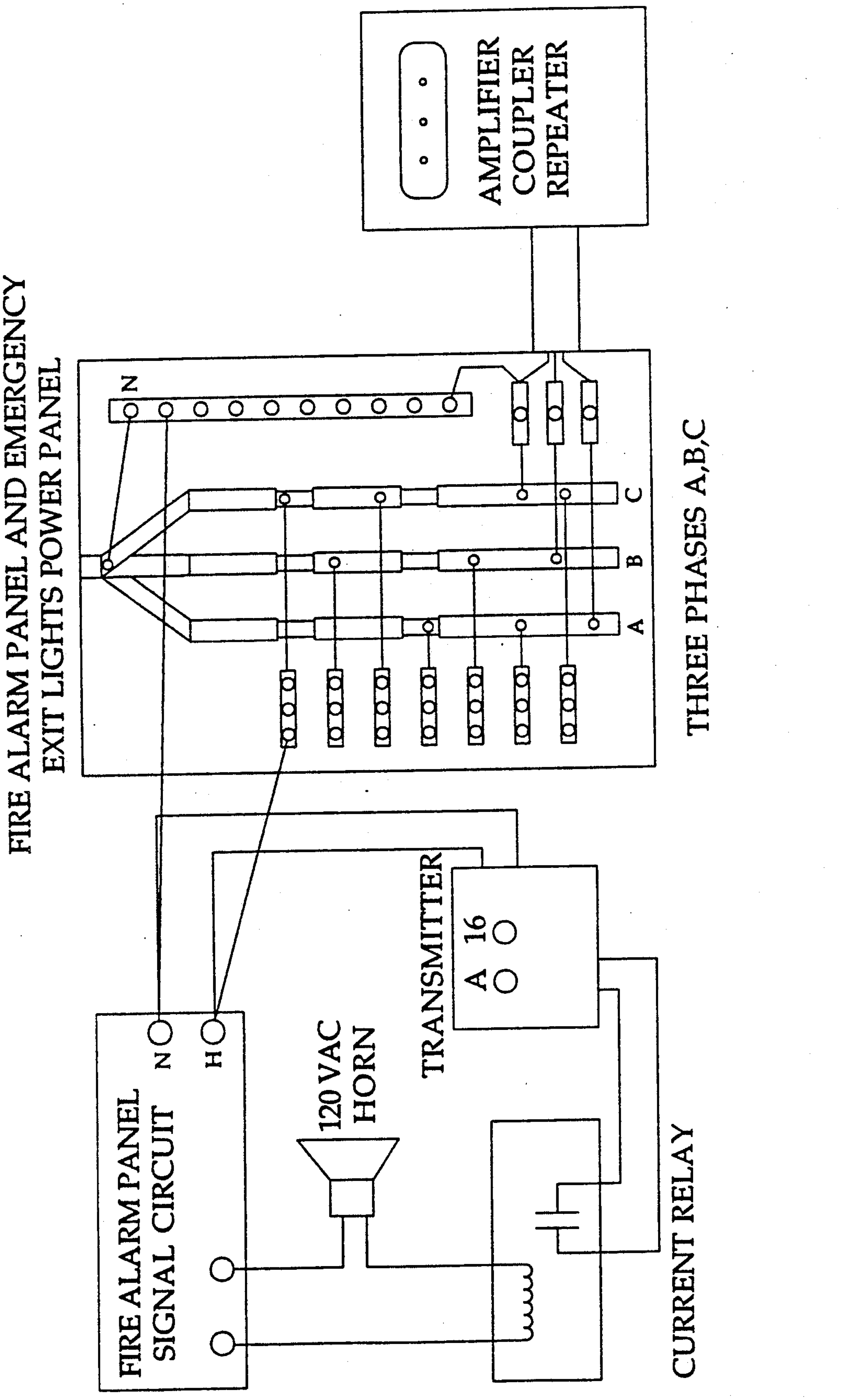
FIGURE 4 COMPONENTS AT FIRE ALARM PANEL

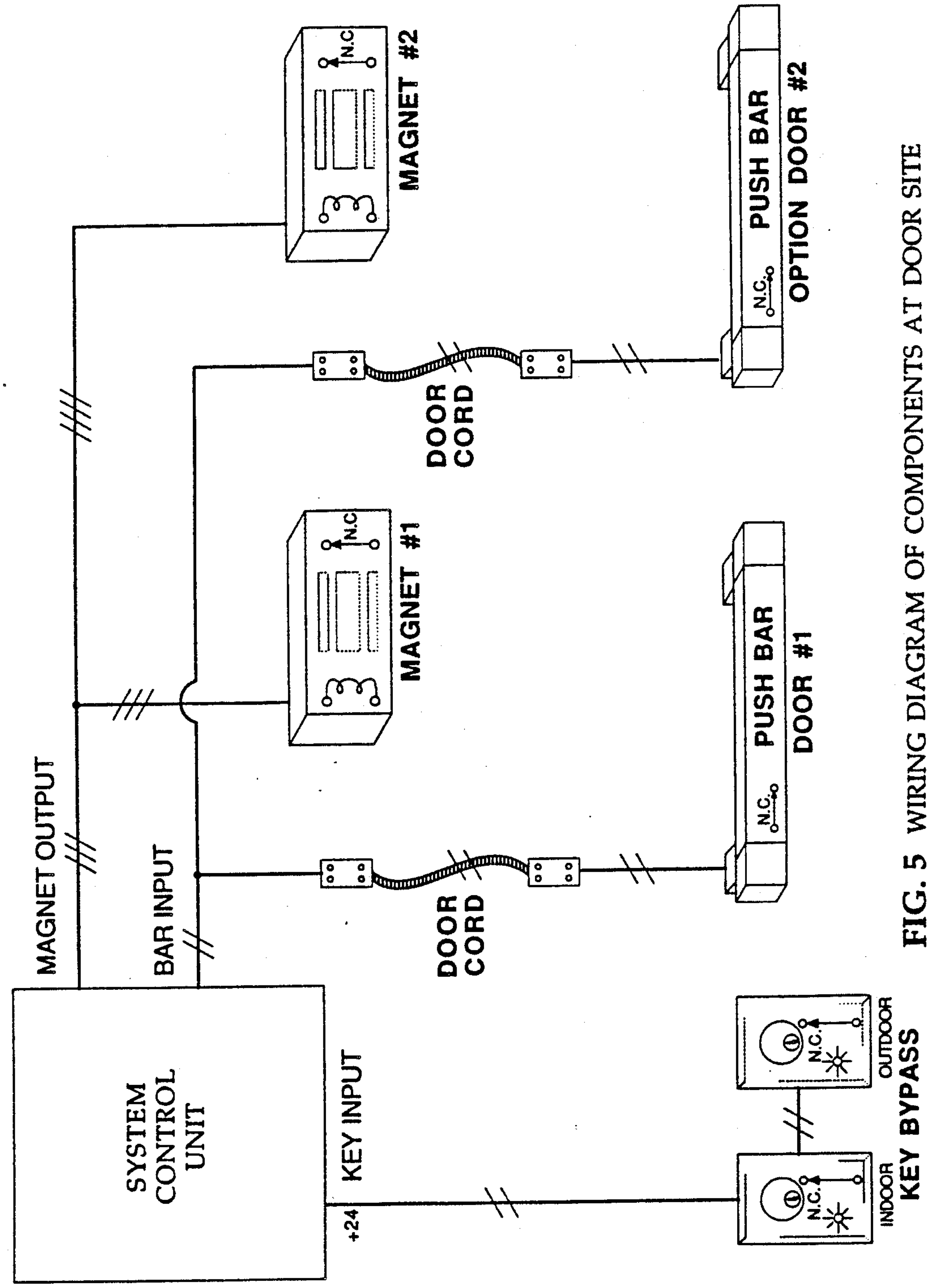
FIG. 5 WIRING DIAGRAM OF COMPONENTS AT DOOR SITE

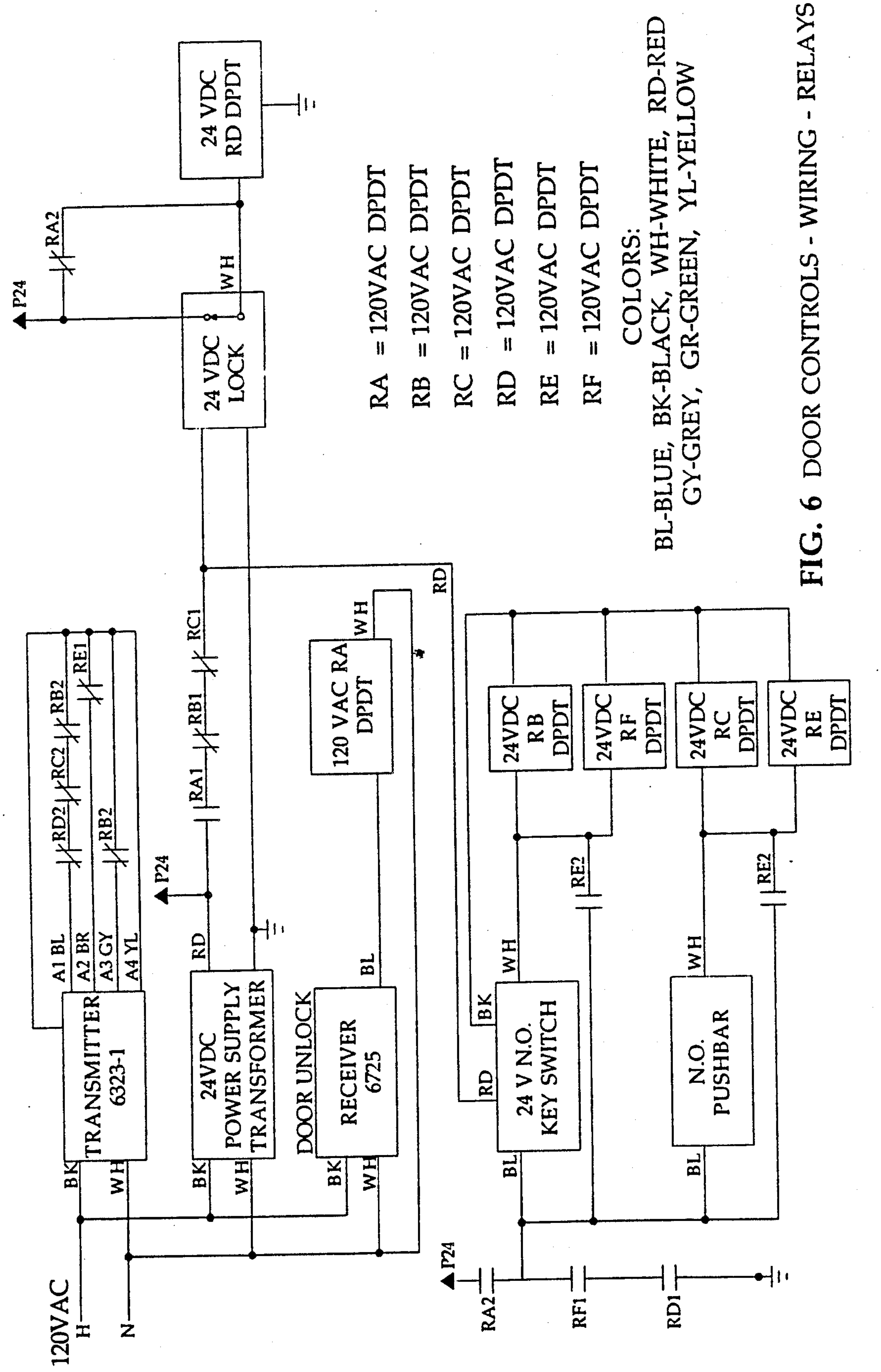
FIG. 6 DOOR CONTROLS - WIRING - RELAYS

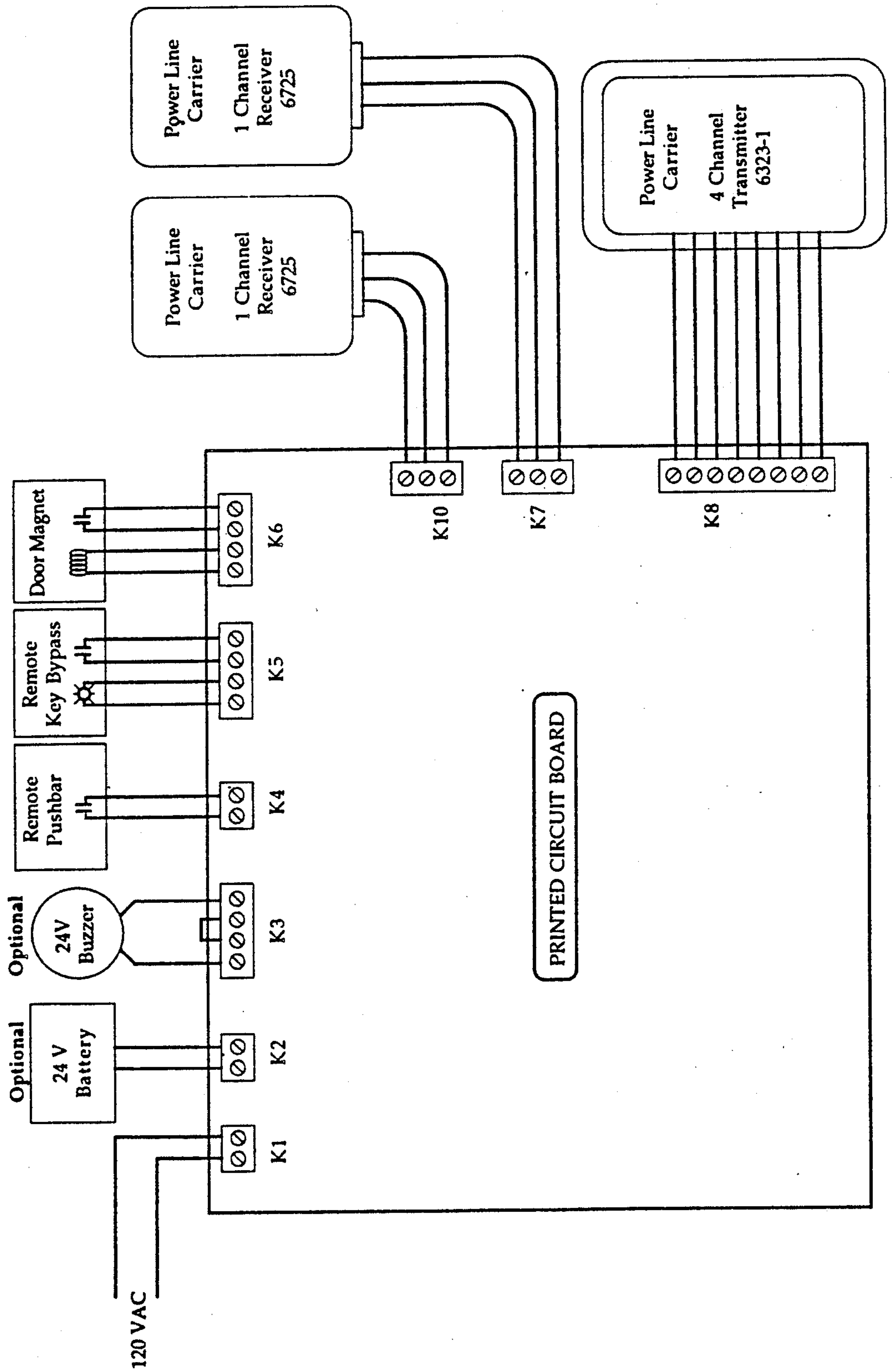
FIG. 7 MICROPROCESSOR CONNECTIONS

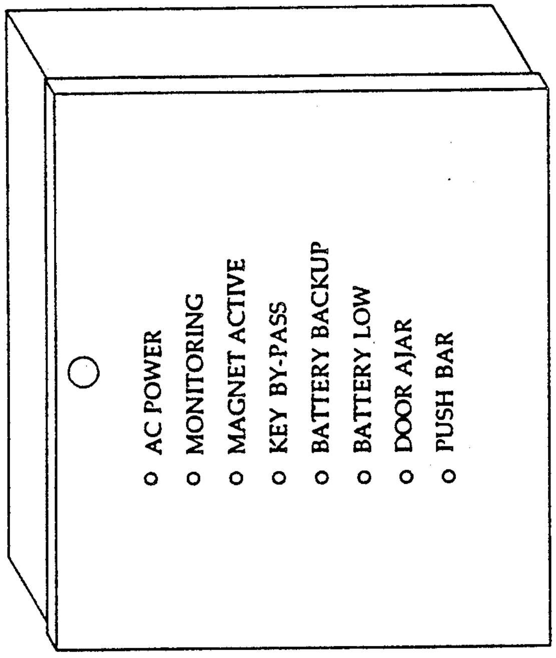
FIG. 8 SYSTEM CONTROL UNIT - EXTERIOR
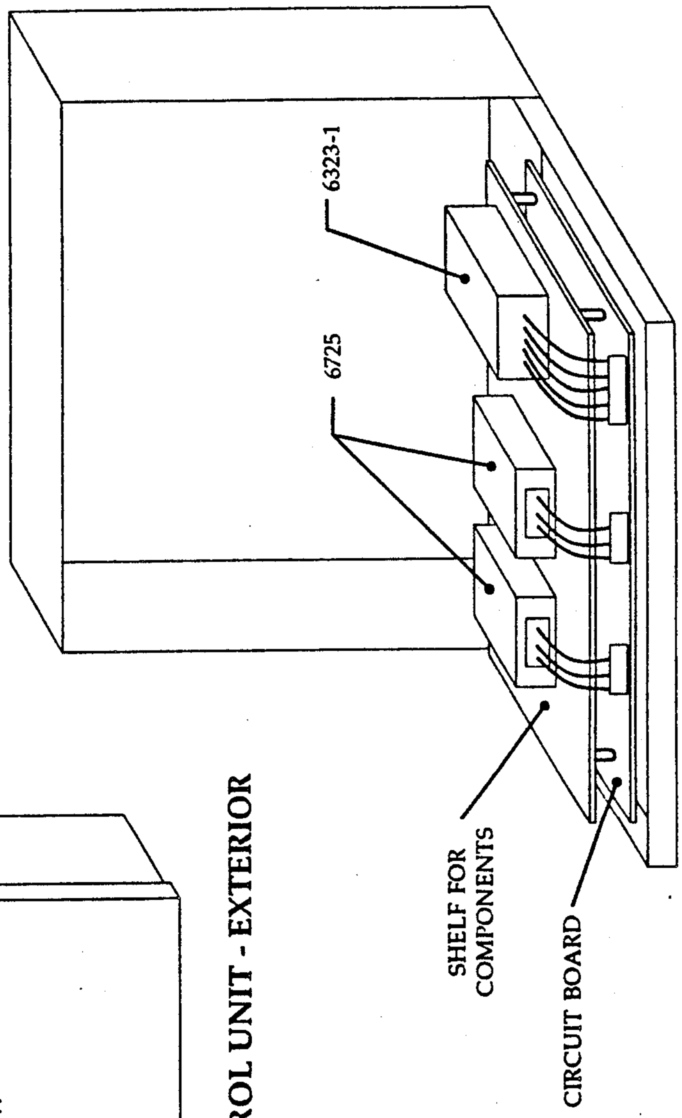
FIG. 9 SYSTEM CONTROL UNIT - INTERIOR

COMPUTERIZED DOOR LOCKING AND MONITORING SYSTEM USING POWER-LINE CARRIER COMPONENTS

BACKGROUND OF THE INVENTION

1. Field of the Invention

The present invention relates to door locking and monitoring systems. More specifically, this invention uses a method of controlling door locks and monitoring each door from a computer using powerline carrier components that send coded commands from the computer to the doors and from the doors to the computer.

2. Prior Art

Until now, electro-door (magnetic, solenoid, etc) locks have been used to secure doors, especially exit doors, in three ways:

a. Hard wiring each electro-door lock to a central system (computer, microprocessor, circuit card, etc.);
b. Manually changing the lock status at each door site;
c. Using a radio frequency to change any door status.

(a) The installation of a hard-wired system involving electro-door locks requires walls and ceilings be torn up to do the necessary hard wiring since connections need to extend from each secured door to the monitoring station. Not only is the building torn apart for weeks, business suffers, dust is unbearable, and the cost of labor and interior redecorating soars and becomes very expensive. Furthermore once installed, the central controls are permanently located due to the wiring.

(b) When only the locks are installed at the door, it is not possible to monitor from a central station. Instead paid personnel must check each of the secured exits, thus maintaining an ongoing cost of security for salary and benefits.

(c) Radio Frequency is a wireless system that can control locks at door exits. However foreign RF cause irregularities and thus can't guarantee security. Furthermore RF systems do not monitor as such.

The present technology of power line carrier components (which can send uniquely addressed commands via existing AC lines to and from each site) combined with computer technology and the appropriate software should provide locking, unlocking, monitoring and telephone notification capabilities.

Furthermore such power line carrier components could at the same time activate and monitor other controls such as motion detectors, cameras, lights, and energy controls via the computer software. The benefits of such a system would be:

1. The System would be much less expensive due to less installation cost;
2. The System could be installed in much less time; (2–6 hours per door site depending upon the complexity of the optional features);
3. The System would preserve the integrity of the building in that ceilings and walls would not be torn apart for wiring to the central controls;
4. The System is movable; i.e. Door units can be used in other locations if, for example, the building is closed or renovated; The monitoring and control station can be moved to another room.
5. The System is upgradable to include other exits, other monitored equipment and other software adaptations.

SUMMARY OF THE INVENTION

This invention is a method of locking, unlocking and monitoring doors using a computer and a computer software program, electro-locking devices wired to power-line carrier components and existing AC wiring from the door sites to the computer.

The computer program changes the status of each door according to a 24 hour, 7 day schedule and displays the locked/unlocked/ajar status of each door as well as the event change (Push bar/key/fire alarm).

Exits are fitted with electro-door locks with sensor capabilities and are monitored from the computer via power line carrier components. At each exit site, a receiver receives commands from the computer and changes the locking status while a transmitter at the door site reports every changed status back to the computer. A microprocessor at each door site can control the doors and operate via battery back-up in a power failure or when communication from the computer program is interrupted. A transmitter at the fire alarm panel causes all doors to unlock if the fire alarm is activated.

To comply with State Fire Codes and users' needs, various options and features are added:

a.) The push bar or button by-pass will allow egress from the building, thus overriding the lock. The computer will receive the use of this override and print the time, date and door location. The door relocks after each override. Whenever the door is not closed when it is to be locked, it sends a "Door Ajar" message to the computer. When the push bar is used or when the door is ajar, a local alarm will sound.

b.) A key or keypad override will allow authorized persons egress or ingress while in the locked position. A message is printed noting the time, date and door location for each key override. The door relocks after each key override. Whenever the door is not closed when it is to be locked, it sends a "Door Ajar" message to the computer.

c.) Local alarms are activated at each door according to the users' needs. These can be buzzers, sirens, loud bells, lights, cameras and can be activated for a designated time.

d.) The computer program emits unique tones and prints a specific message for each override, door change and door ajar event.

e.) If an override occurs during specified hours defined by the user, the program may dial a phone number(s) and deliver a message regarding the door that has been unlocked. Other remote monitoring of the screen at a given site is possible using such software as "Carbon Copy" and a modem.

BRIEF DESCRIPTION OF THE DRAWINGS

FIG. 4 is a wiring diagram of the components at the fire alarm panel, namely the repeater/coupler/amplifier and the transmitter.

FIG. 6 is a wiring diagram illustrating the relays.

FIG. 7 is a top-view of the microprocessor card of the system control unit.

FIG. 8 is a perspective view of the outside of the system control unit.

FIG. 9 is a perspective view of the inside of the system control unit.

DETAILED DESCRIPTION OF THE PREFERRED EMBODIMENT

We describe now the invention which is both method and apparatus or system. The method of controlling and monitoring door locks at multiple door sites wherein each door is equipped with an electro-locking device and each door site is equipped with a system control unit, of monitoring the activation of the fire alarm in which case all doors are unlocked, uses basically a computer, a transceiver and a computer program.

All of the components have been manufactured by other companies as described below. We have combined these components with software to accomplish the task described. Furthermore we describe the manufacture or the assembly of the properly wired components in a system control unit.

The preferred embodiment of the present invention will now be described in connection with each Figure.

Figure 1:
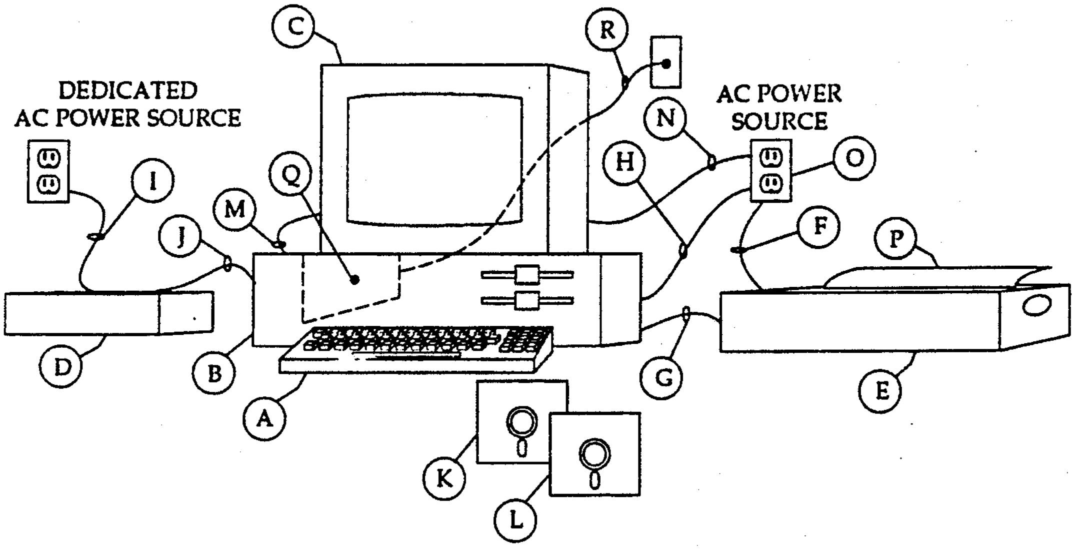
FIG. 1 is a perspective view of the components of the preferred embodiment at the monitoring station.

This embodiment comprises the following computer related equipment located at the Monitoring Station shown in FIG. 1:

A: a means (usually a keyboard) for selecting items from the screen;

B: an IBM compatible computer having a memory of at least 640K, two floppy disk drives, a color card, both serial and parallel ports, a means of maintaining time and date or an automatic time clock;

C: a color display screen;

D: powerline carrier interface unit (Leviton PCC 6300 Stand-Alone Transceiver); This interface, not only stores in its memory the transmissions both of door changes received from the door transmitters and of A16 from the fire alarm transmitter, but it also transmits these to the computer via the serial port. Furthermore it also enables the computer to transmit to the receivers at each equipped door site a changed status for that door. Transmissions both from and to the computer/interface travel on the existing AC power lines operating from one transformer. The program takes and processes one transmission at a time. (See manufacturer's specifications of 6300 transceiver)

E: a means to output data, usually a printer (Okidata, Panasonic, Epson) that outputs to continuous feed 8.5×11 paper; Whenever the user selects door changes be written to the printer device, then the time, date, location, means of change (Key, panic/-push bar, keyboard input, fire alarm activation, etc.) is printed.

F: Printer AC cable;

G: printer cable to computer parallel port;

H: computer AC cable;

I: interface AC cable;

J: a standard RS-232 connector with a DB-25 pin configuration in which only 3 signal lines are used to transfer data to and from the computer: 2:TX transmits, 3:RX receives, 7:GND signal ground. Since the 6300 Transceiver does not use the other lines, they are to be wired to each other as a "null modem" so that the computer's signals are self timing;

K: program diskette to be placed in Drive A or floppy disk A; The program listed in Appendix A has been written in dBase and compiled with the Clipper Software. It utilizes SilverWare and Clipper routines; See Appendix A for program listing.

L: floppy disk B: a formatted disk with Log7days.dbf file Whenever the user selects the door changes be written to disk, then information comprising the time, date, location, means of change (Key, panic/-push bar, keyboard input, fire alarm activation,etc) is written to the file named "log7days.dbf" on the disk in drive B.

Figure 2:
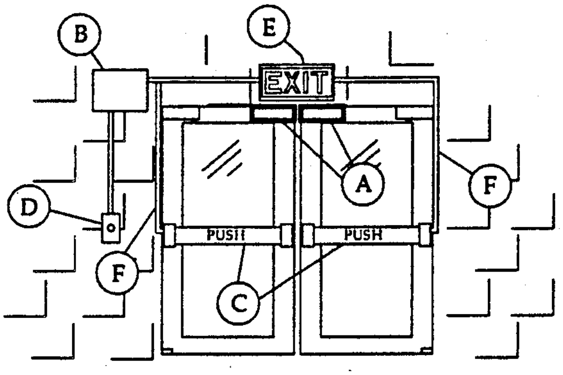
FIG. 2 is a perspective view of the components at a door site of the preferred embodiment.

M: monitor cable from monitor to computer;

N: monitor AC cable;

O: surge Protector;

P: paper loaded properly in the printer;

Q: Optional Votrax card used when telephone notification is needed;

R: Optional RJ11 telephone cables from Votrax card to RJ11 phone jack; All connections, transceiver, computer, printer must be made before power up since it is at power up that the transceiver reads the wired-in baud rate. The program uses 300 baud;

This embodiment comprises the following components located at each door site shown in FIG. 2:

A: 1200 lb. electro-magnetic lock(s) with sensor capabilities (set of contacts to determine door ajar condition) affixed to the door frame and powered by 24 V D.C. The door ajar condition triggers devicecode1 ON which transmits the event to the computer; We have tested Securitron's Magnalock with its SENSTAT™ lock status sensor along with their installation kit. Various models fit outward and inward swinging doors.

B: system control unit comprising Leviton transmitter with four channels: 1-ajar, 2-pushbar/button, 3-key by-pass, 4-acknowledge, (See specifications for Leviton transmitter, Catalog #6323) at least one Leviton receiver to receive lock/unlock status changes from computer (See specifications for Leviton #6725), a second (optional) receiver to receive acknowledgements or other changes, the necessary AC-DC transformer(s) (120vac–24vdc or 240vac–24vdc), optional microprocessor board, optional battery, necessary wiring and coupling, housed in tamper-resistant box with LEDs to indicate usage of various components;

C: electronic or standard pushbars, modified to house a normally closed contact, override the magnetic locks and permit free egress; When the pushbar is used to exit a locked door, a local alarm is sounded and devicecode2 transmits ON to the computer; (See specifications for recommended Securitron touch sense bar)

D: key switch panels or key overrides allow authorized persons to enter by using a key. The key condition triggers devicecode3 which transmits ON to the computer;

E: an exit sign or source of AC power usually wired to the emergency panel;

F: door cord or wired hinge that connects the movable door with the fixed frame. These wires are supervised and any damage would result in de-energizing the door magnet for the "fail-safe" system that unlocks when power is lost. The optional "fail-secure" door controller is wired so that if communication from the computer or power lines is lost, the battery back-up would maintain a locked status.

Figure 3:
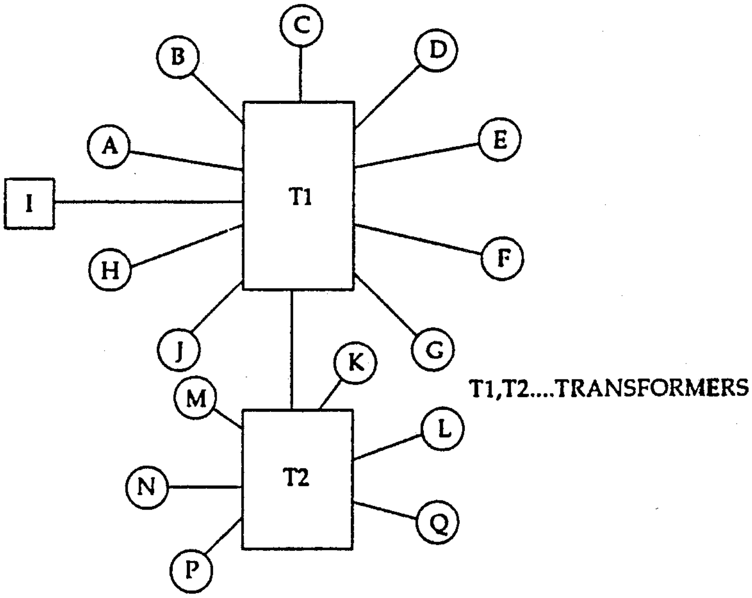
FIG. 3 is a wiring diagram of the door sites and computer to the transformer(s).

FIG. 3 indicates that all of the equipped door sites (A,B, . . . ) and the 6300 transceiver/interface AC connection (FIG. 1,letter I) must use the same AC transformer. If this is not the case, then the transformers must be coupled to enable each door site and the interface/computer to receive and send addresses and codes to each other via the the coupled transformers.

FIG. 4 illustrates modifications at a fire alarm panel and the necessary wiring:

A. coupler/repeater/amplifier couples the signals across different phases, amplifies the signals from either direction and repeats them; (See specifications for Leviton #6272 C.R.P)

B. a Leviton #6323 transmitter whose address is set at P-16. When the fire alarm is engaged, the software recognizes this address as the fire alarm and unlocks all locked doors, displays the fire event on the screen and outputs a message that notes time and date.

FIG. 5 illustrates a wiring diagram of the door components at a site where two door magnets are installed for a double door, each of which have a push bar and where two key by-passes (inside and outside) are used.

FIG. 6 is a wiring diagram for the system before the microprocessor was introduced. It indicates the various relays and the 24vdc and 120 vac power source that are also used in the microprocessor. The relay logic design is as follows:

RA1 - N.O.=Turns on Door magnet when AC receiver is told to activate ts blue wire output. Lock Door.

RA2 - N.O.=Disables buzzer from sounding when the door magnets are in the locked state. Disables the push bar/button and key bypass from activating their relay coils. This prohibits unnecessary transmitter inputs during the unlocked door state.

-N.C.=Disables the door ajar relay from dropping out which would transmit door ajar and sound the buzzer. This is not necessary when the doors are in the unlocked state.

RB1 - N.C.=Turns off door magnet when the key bypass has been selected.

RB2 - N.O.=Shorts the grey and red wire on the transmitter which transmits to the computer that the key bypass has been selected.

N.C.=Opens the blue to red wire transmitter connection to block out the door ajar transmitter input when the key bypass is being used.

RC1 - N.C.=Turn off door magnet when the push bar/button is pressed.

RC2 - N.C.=Opens the blue to red wire transmitter connection to block out the door ajar transmitter input when the push bar/button is being used.

RD1 - N.C.=Turns on the buzzer when the door ajar relay drops out.

RD2 - N.C.=Shorts the blue and red wires on the transmitter which transmits that the door is ajar.

RE1 - N.O.=Shorts the brown and red wires on the transmitter which transmits to the computer that the push bar/button has been pressed.

RE2 - N.O.=Latches the push bar/button relay which latches the door in the unlocked state. Buzzer is on.

RF1 - N.C.=Opens the buzzer power path when the key bypass is being used.

RF2 - N.O.=Latches the key bypass relay which latches the door in the unlocked state.

FIG. 7 is a top view of the microprocessor card which note the plug-in units for the various components. The microprocessor handles the above relays in its programming and determines a set delay after each door change event. When either the key or push bar is used, the devicecode for the unit transmits ON and the address to the computer, the microprocessor unlocks the door, sounds the alarm for the push bar, delays for a period, relocks the door, shuts the devicecode OFF which transmits back to the computer. When a door becomes ajar, devicecodel transmits ON to the computer and OFF when the door is relocked. The system control unit which comprises the components, the microprocessor and the door site program written in basic, actually locks and relocks the doors in most of the cases. The computer program locks and unlocks the doors only at schedule changes and at keyboard input.

The microprocessor card with the necessary components is secured within a suitable tamper-resistant metal structure and mounted either in the ceiling tiles out of sight or on the wall. Its use replaces the more complex-looking system that involved much wiring. All components such as the transmitter, receivers, locks and all optional alarm devices are connected to it.

The microprocessor is not necessary for the invention but we have chosen to include it in the preferred embodiment for these reasons:

1. Fewer signals are sent via AC lines, as microprocessor controls locks, buzzers, keylocks, and other optional alarms at each door and can determine delays for each;
2. Enables easier custom programming for each door site if the user desires such;
3. Maintains locked status of each door when computer is turned off, yet allows keylock and other bypasses to function in same manner as with the computer program;
4. With battery back up, it continues to secure exits when a power outage occurs;
5. It is used to acknowledge receipt of transmissions in that it communicates from the door back to the computer;
6. It enables easier installation and field diagnosis and in the long run will be more cost efficient and less labor-intensive.

FIG. 8 is a perspective top view of the system control unit or door controller. The LEDs on the cover indicate varying states:

the monitoring light is on whenever the unit is monitoring;

the A.C. power light indicates there is AC power;

the door magnet light is on when the lock is energized, off when the door is unlocked;

the key-lock light goes on whenever the key is used to unlock a door; The next five LED's indicate trouble and alarm situations:

the battery back-up light goes on when AC current is lost and the battery back-up is being used;

whenever the battery is low, the battery low LED lights up;

whenever the door is ajar, the door ajar LED is on;

whenever the push bar or panic bar is used to exit a locked door, this LED lights up;

the last symbol lights up whenever the microprocessor is not functioning correctly.

FIG. 9 shows the top cover of the system control unit lowered showing the two shelves within the unit. The bottom shelf is the microprocessor card into which all the components are plugged. The necessary components are arranged and secured on the second shelf. This perspective view shows the system control unit which houses the controls: the microprocessor, the transmitting and receiving devices properly wired. The transmitting device is uniquely addressed per door site and addressed A16 at the fire alarm panel. Four channels are used in the following way at the door sites:

Red and Blue: 1 transmits ON when a door is ajar, OFF when the door closes after ajar and the door is secured;

Red and Brown: 2 transmits ON when the push bar is engaged, OFF when the microprocessor triggers it to its OFF position;

Red and Grey: 3 transmits ON when the key by-pass is used, OFF when the microprocessor triggers it to its OFF position;

Red and Yellow: 4 transmits either an ON or an OFF each time the computer program (schedule or keyboard input) changes a door status, thus acknowledging at the screen the received transmission.

(See manufacturer's specifications of Transmitter 6323)

In a 16 door installation, the doors are addressed A,B,C, . . . O,P and numbers 1, 2, 3, 4 clearly define to the computer the correct device.

In a 32 door installation, the 16 lettercodes are A,B,C, . . . O,P and the transmitters at doors 17 through 32 send 9 rather than 1 for ajar, 10 rather than 2 for pushbar, 11 rather than 3 for key bypass, 12 rather than 4 for acknowledge.

In a 48 door installation, the transmitting devices are addressed as follows:

Ajar: A1,B1, . . . ,P1,A6,B6, . . . ,P6,A11,B11, . . . ,P11

Pushbar: A2,B2, . . . ,P2,A7,B7, . . . ,P7,A12,B12, . . . ,P12

Keylock: A3,B3, . . . ,P3,A8,B8, . . . ,P8,A13,B13, . . . ,P13

Acknowl: A4,B4, . . . ,P4,A9,B9, . . . ,P9,A14,B14, . . . ,P14

The Fire Alarm has been assigned address A16. When the computer receives this transmission, it unlocks all locked doors, displays fire on the screen and on the output, and waits for keyboard input following the resetting of the fire alarm panel.

Also within the control unit are 2 Leviton Receivers #6725 (See Manufacturer's specifications) whose addressable lettercode matches that of the transmitter. The addressable numbercode is 5 for the first 16 doors, 10 for doors 17 through 32 and 15 for doors 33 through 48 for a 48 door installation. Similar addressing is done for a 32 door installation. These addressed receivers receive locked/unlocked status from the computer. Furthermore another address (4) can be used to acknowledge the receipt of each transmission from a door site: when a door change is sent to the computer, the microprocessor waits to receive an acknowledgement via receiver 4. If none is received within a certain number of seconds, another door change transmission is sent out. (See Manufacturer's specifications)

In short, the receivers or receiving devices are addressed as follows:

For 16 doors:

Lock/Unlock: A5,B5,C5,D5,E5,F5,G5,H5,J5,K5, . . . ,O5,P5

Acknowledge: A4,B4, . . . ,P4 (one way computer to door)

For 32 doors:

Lock/Unlock: A5,B5, . . . ,P5,A13,B13, . . . , P13

Acknowledge: A4,B4, . . . ,P4,A12,B12, . . . ,P12 (one way)

For 48 doors:

Lock/Unlock: A5,B5, . . . ,P5,A10,B10, . . . ,P10,A15, . . . ,P15

Acknowledge: A4,B4, . . . ,B4,A9,B9, . . . ,P9,A14, . . . ,P14

Appendix A is a listing of the executable program. Below is a layman's description of the program.

Two files are maintained by keyboard input:

1. doordata.dbf: This doordata file stores the door number, the door name or location or description, and the status of each door. The Status of each door is either X, L or U for unused, Locked, or Unlocked respectively.
2. dtsarray.dbf: This schedule file shows the predetermined locked or unlocked status of each door at various times of various days. The schedule currently allows 20 different time schedules per day in a 7 day week. Users can input an added time, L for Lock, U for Unlock. When that time occurs, signals are sent out to all non-X doors to Lock or Unlock and the status in the doordata file is updated for each door site.

When the program begins, it sets up the screen according to the door data and schedule files, transmits the locked or unlocked status from the schedule file to all monitored and equipped door sites, chooses either the printer (by default) or disk output means, checks the serial port and then begins a repeating loop or an ongoing process that checks out these cases:

If input is received via the means for selecting items from the key screen (usually a keyboard), then the program processes acceptable input and flushes out unacceptable input. Acceptable input include the following:

H - provides on-screen help to execute the program;

L - changes the status of an unlocked door to become locked; Program asks doornumber to be input.

U - changes the status of a locked door to become unlocked; Program asks doornumber to be input.

R - resets the locks at all door sites according to schedule;

S - displays the current day's schedule and waits up to 20 seconds for further keyboard input before returning to door display screen. User may set or alter schedule.

Retaining an X in the schedule results in no change to that specific door when that time occurs.

Schedule input options are:

ins: insert a new time in military format del: delete a time and all statuses

L: locks a door for a specific time

U: unlocks a door for a specific time

→: moves the cursor to the right

←: moves the cursor to the left

↑: moves the cursor up

↓: moves the cursor down

PgUp: pages from current day to next day(Mon, Tues, Wed . . . )

PgDn: pages from current day to previous day(Mon, Sun, . . . )

end: returns program to the door display screen

P - toggles the output file between the printer and the "log7days.dbf" file on the B drive. When going from disk output to the printer, the log file is printed and zapped. Thus it is possible to change the output means from the printer to the disk or from the disk to the printer. It is also possible to initiate the output or more specifically to print the log7days.dbf file. The password DOOR is needed to use P.

E - edits data in doordata file. Allows user to add or delete a door site, or to change the door name or description. The password DOOR is needed to edit.

The program takes received transmissions from the computer interface (Leviton Powerline Carrier Component 6300 Transceiver) one at a time, processes the received transmissions for an acceptable address and ON/OFF code and then performs multiple operations accordingly to provide adequate monitoring:

1. If Key-override is ON to unlock a door, then a message is printed to output noting the door number, name, time and date and use of key, the screen shows in green KEYLK at the appropriate door, and the computer emits a unique audio-sound. When Key-override shows OFF, the screen resumes its locked display in red.
2. If Push bar or button is ON to unlock a door, a message is printed to output noting the door number, name, time and date and use of push bar/button, the screen displays in green PUSH/PANIC and the computer emits another unique sound. When the push bar override shows OFF, the screen resumes its locked display in red.
3. If a door lock is energized(locked), yet the door is not locked or the locks are not touching, the door ajar is ON. A message is printed to output noting the door number, name, time and date and ajar status, the screen displays red blinking o white the AJAR status until the door is locked and the computer beeps the door number of times. When the door ajar is triggered OFF, then the output shows the relocked status, the screen displays locked in red and the computer beeps to signal closure.
4. If a transmission is received from the fire alarm transmitter (addressed A16), the program unlocks all equipped doors, updates the screen with Fire at all doors, and halts the loop process until the user enters the next command to continue or to exit. An on-screen message prompts the user to reset the fire alarm before continuing with the program. When the loop is reentered, the interface buffer memory is cleared and readied to receive further data.

If the schedule indicates a time change, the program resets the door status of each door whose date is non-X by sending out the Lock or Unlock command to the appropriate address. Otherwise the program displays in color the status of each equipped door as follows:

Green: Unlocked (Unlckd or U); all overrides;

Red: Locked (Locked or L);

Blinking red on white: Door Ajar (Ajar or A)

The screen is updated after each schedule change, after keyboard input, after received transmissions from the interface.

The program can be compiled with a phone notification routine that dials a telephone number(s) and delivers a message during specified hours to provide monitoring remotely. Such is accomplished using the Votrax Card and additional software.

```
***                    DOOR 16 PROGRAM - 12/1/89 PTO
SET TALK OFF
SET DEVICE TO SCREEN
SET SCOREBOARD OFF
*  ***********************************************************
*  log = (P)printer or (D)diskette log file
*  fire - is the variable used to indicate too the commsg
*         program for a real or simulated fire
*  pb  = panic button was returned
*  kl  = key lock was returned
*  rtrn = lock bit in return was set on or off
*  ***********************************************************
setonalarm = .F.
fire = 'OFF'
port = 1
CLEAR
ok = .F.
DO WHILE .NOT. ok
  error = OPENCOMM(1,400,400)
  IF error <> 0
    @ 14,15 SAY 'Error With Serial Port.  Press Enter To Continue.'
    WAIT ' '
    LOOP
  ELSE
    ok = .T.
  ENDIF
ENDDO
SETBAUD(1,300,0,1,8)
*
 delay = -1
 ans = " "
 DO WHILE delay < 0
   @ 14,10 SAY 'ENTER DELAY TIME FOR XMITS'
   @ 14,38 GET ans PICTURE '@!'
   READ
   x = VAL(SUBSTR(ans,1,1))
   delay = 6*x
   @ 14,42 SAY delay
 ENDDO
*
```

```
RXFLUSH(1)
*
**** clears the receive buffer
  SELECT b
outstring = "UX"
out_string = "UR0"
TXSTRING(1,out_string)
TXCHAR(1,CHR(13))
out_string = "R"
TXSTRING(1,out_string)
TXCHAR(1,CHR(13))
TXSTRING(1,out_string)
TXCHAR(1,CHR(13))
SWDELAY(42)
STORE .T. TO recv_done
out_string = "UR1"
*****
*
CLEAR
*
*
log = " "
ans = ' '
DO WHILE log <> 'D' .AND. log <> 'P'
  @ 14,10 SAY 'WOULD YOU LIKE A DISKETTE OR PRINTER LOG FILE? (D/P):'
  @ 14,64 GET ans PICTURE '@!'
  ans = inkey(5)
  if ans = 0
     log = "P"
  else
     log = upper(chr(ans))
  endif
ENDDO
CLEAR
*
*
PUBLIC dtsarray,lcolor,ucolor,ncolor,mcolor,bcolor,byte1,fire,setonalarm,k1
PUBLIC single,pointer,abvdate,page,doorchg,deviceno,on_off,byte16,log,byte3,pb
PUBLIC lettercode,delay
*
DECLARE dtsarray[140]
DECLARE screens[2]
IF log = 'D'
  SELECT c
  USE b:log7days
ENDIF
SELECT b
USE doordata
GOTO TOP
SELECT a
USE dtsdata
GOTO TOP
FOR i = 1 TO 140
  dtsarray[i] = dtsdatafld
  SKIP
NEXT
*  ***********************************************************
*  SETUP OF THE POINTER TO THE FIRST SCHEDULED TIME
*  OF THE CURRENT DAY
*  ***********************************************************
x = 1
found = .F.
DO WHILE .NOT. found
  IF SUBSTR(dtsarray[x],1,3) <> UPPER(SUBSTR(CDOW(DATE()),1,3))
    x = x + 20
  ELSE
    pointer = x
    page = x
    found = .T.
  ENDIF
ENDDO
*  ***********************************************************
*
SELECT b
GOTO TOP
*
lcolor = 'N/R,N/R'
ucolor = 'N/G,N/G'
ncolor = 'N/BG,N/BG'
mcolor = 'N/RB,N/RB'
acolor = 'B/W+*,B/W+*'
```

```
bcolor = 'G/N,G/N'
ecolor = 'N/GR+,N/GR+'
oneline = CHR(196)
single = CHR(218)+CHR(196)+CHR(191)+CHR(179)+CHR(217)+CHR(196)+CHR(192)+CHR(179)
*
* **************************************************************
* SEND OUT THE DOOR NUMBER TO THE "XMIT" PROGRAM WHICH
* NEED TO BE LOCKED OR UNLOCKED
* **************************************************************
abvdate = SUBSTR(CDOW(DATE()),1,3)
last = '99:99'
FOR i = 1 TO 16
    IF status <> 'X'
       doorchg = i
       deviceno = 5
       if status = "U"
          on_off = "OFF"
          DO XMIT
          DO XMIT
       else
          on_off = "ON"
          DO XMIT
          DO XMIT
       endif
    ENDIF
    SKIP
NEXT
* **************************************************************
*
* **************************************************************
* NEVER ENDING DO WHILE LOOP
* Fire - is the variable used to indicate a real or simulated fire
* **************************************************************
setscreen = .T.
done = .F.
DO WHILE .NOT. done
  fire = 'OFF'
  setonalarm = .F.
*
* **************************************************************
* SETUP OF THE DOOR DISPLAY SCREEN EACH LOOP OF PROGRAM
* **************************************************************
*
  SET COLOR TO &bcolor
  @ 1,71 SAY TIME()
  IF setscreen
    SET COLOR TO
    @ 1,0 CLEAR TO 24,80
*
    SET COLOR TO &bcolor
    @ 1,3 SAY abvdate
    @ 1,7 SAY DATE()
    @ 1,33 SAY '* COMP-U-LOCK-16 *'
    @ 1,71 SAY TIME()
    @ 4,4,20,38 BOX single
    @ 4,43,20,77 BOX single
*
    row = 6
    col1 = 5
    col2 = 44
    FOR p = 1 TO 7
      @ row,col1 SAY '---------------------------------'
      @ row,col2 SAY '---------------------------------'
      row = row + 2
    NEXT
    SET COLOR TO &bcolor
    @ 22,17 SAY '(c) Copyright 1988,1989 Tri-State Telecomputers'
    @ 24,0 CLEAR TO 24,80
    SET COLOR TO &mcolor
    @ 24,4 SAY log
    @ 24,17 SAY 'Help Reset Lock Unlock Edit Schedule Print Off'
*
    SELECT b
    GOTO TOP
*
    row = 5
    col = 6
    doornum = 1
    DO WHILE doornum < 17
      IF status = 'L'
```

```
      SET COLOR TO &lcolor
      @ row,col SAY '#' + STR(doornum,2) + ' Locked' + ' - ' + doordesc
    ELSE
      IF status = 'U'
        SET COLOR TO &ucolor
        @ row,col SAY '#' + STR(doornum,2) + ' Unlked' + ' - ' + doordesc
      ELSE
        IF status = 'P'
          SET COLOR TO &ucolor
          @ row,col SAY '#' + STR(doornum,2) + ' Panic ' + ' - ' + doordesc
        ELSE
          IF status = 'K'
            SET COLOR TO &ucolor
            @ row,col SAY '#' + STR(doornum,2) + ' Keylck' + ' - ' + doordesc
          ELSE
            SET COLOR TO &ncolor
            @ row,col SAY '#' + STR(doornum,2) + ' Unused' + ' - ' + doordesc
          ENDIF
        ENDIF
      ENDIF
    ENDIF
    SKIP
    row = row + 2
    doornum = doornum + 1
    IF doornum = 9
      row = 5
      col = 45
    ENDIF
  ENDDO
  setscreen = .F.
ENDIF
*  *************************************************************
*
*  *************************************************************
*  A 0 SEC WAIT FOR ANY KEY TO BE ENTERED AND CHANGE ANY
*  VALVED ENTRY TO UPPER CASE
*  *************************************************************
j = 00
j = INKEY()
*
IF j = 23
  ok = .F.
  DO WHILE .NOT. ok
    error = CLOSECOMM(1,400,400)
    IF error <> 0
      CLEAR
      @ 14,15 SAY 'Error With Serial Port.  Press Enter To Continue.'
      WAIT ' '
      LOOP
    ELSE
      ok = .T.
    ENDIF
  ENDDO
  CLOSE DATABASES
  SET COLOR TO
  CLEAR
  RETURN
ENDIF
IF j = 104
  j = 72
ELSE
  IF j = 108
    j = 76
  ELSE
    IF j = 117
      j = 85
    ELSE
      IF j = 101
        j = 69
      ELSE
        IF j = 115
          j = 83
        ELSE
         IF j = 102
           j = 70
         ELSE
           IF j = 112
             j = 80
           ELSE
             IF j = 111
               J = 79
```

```
            ELSE
              IF j = 114
                j = 82
              ENDIF
            ENDIF
          ENDIF
        ENDIF
      ENDIF
    ENDIF
   ENDIF
  ENDIF
 ENDIF
*  ************************************************************
*
*  ************************************************************
*  CASE STATEMENT TO ACT ON ANY VALVED KEY ENTRY
*  VALVED ENTRY TO UPPER CASE
*  ************************************************************
 DO CASE
*  ************************************************************
*  72 = HELP KEY
*  ************************************************************
  CASE j = 72
       SAVE SCREEN TO screens[1]
       SET COLOR TO
       @ 0,0 CLEAR TO 24,80
       @ 7,12 SAY 'This system controls & secures multiple exits including'
       @ 8,12 SAY 'fire emergency passages.'
       @ 9,12 SAY 'The bottom most CRT line displays the valid keyboard com-'
       @ 10,12 SAY 'mands.  Type the first charactor of any desired command '
       @ 12,17 SAY 'Help - prints this message'
       @ 13,17 SAY 'Reset - resets the locks according to the schedule '
       @ 14,17 SAY 'Lock - locks any valid, installed exit'
       @ 15,17 SAY 'Unlock - unlocks any valid. installed exit'
       @ 16,17 SAY 'Edit - enters or deletes any exit description '
       @ 17,17 SAY 'Schedule - automatic time clock to control exits'
       @ 18,17 SAY 'Print - toggles printer or disk log, prints data'
       @ 19,17 SAY 'Off - unlocks all locked doors before exiting the program'
       SET COLOR TO &mcolor
       @ 21,27 SAY 'PRESS ANY KEY TO CONTINUE'
       SET COLOR TO
       WAIT ' '
       RESTORE SCREEN FROM screens[1]
*  ************************************************************
*  76 = LOCK KEY
*  ************************************************************
  CASE j = 76
       SELECT b
       number = 0
       SET COLOR TO
       @ 24,0 CLEAR TO 24,80
       SET COLOR TO &lcolor
       @ 24,3 SAY 'Enter Door Number : ' GET number PICTURE '99' RANGE 1,16
       READ
       num = LTRIM(STR(number,2))
       LOCATE FOR doornumber = number
*
       IF status = 'X'
         SET COLOR TO
         @ 24,0 CLEAR TO 24,80
         SET COLOR TO &mcolor
         @ 23,1 SAY SPACE(0)
         WAIT "   Door " +num+ " Is Unused. It Can't Be Locked.  PRESS ENTER."
       ELSE
         REPLACE status WITH 'L'
         COMMIT
         SAVE SCREEN TO screens[1]
         doorchg = number
         deviceno = 5
         on_off = "ON"
         DO XMIT
         DO XMIT
         setscreen = .T.
         RESTORE SCREEN FROM screens[1]
*
         IF log = 'P'
           SET DEVICE TO PRINT
           r = PROW()
           @ r,1 SAY 'At '+SUBSTR(TIME(),1,5)+' door  '+num
           @ r,PCOL() + 1 SAY ' was locked at the keyboard'
           @ r,PCOL() + 1 SAY "on "+CDOW(DATE())+", "
```

```
        @ r,PCOL() SAY CMONTH(DATE())+STR(DAY(DATE()))
        @ r + 1,1 SAY ' '
        SET DEVICE TO SCREEN
      ELSE
        SELECT c
        message = 'At '+SUBSTR(TIME(),1,5)+' door  '+num+;
        ' was locked at the keyboard on ' + CDOW(DATE())+;
        ', ' + CMONTH(DATE())+STR(DAY(DATE()))
        APPEND BLANK
        REPLACE day WITH CDOW(DATE())
        REPLACE msg WITH message
        COMMIT
        SELECT b
      ENDIF
*
      IF number > 0 .AND. number < 9
        col = 6
        row = (number * 2 ) + 3
      ELSE
        col = 45
        row = ((number - 8 ) * 2 ) + 3
      ENDIF
      @ row,col SAY '#' + STR(number,2) + ' Locked - ' + doordesc
    ENDIF
    SET COLOR TO &bcolor
    @ 22,17 SAY '(c) Copyright 1988,1989 Tri-State Telecomputers'
    @ 24,0 CLEAR TO 24,80
    SET COLOR TO &mcolor
    @ 24,4 SAY log
    @ 24,17 SAY 'Help Reset Lock Unlock Edit Schedule Print Off'
    SELECT a
*  ***********************************************************
*  85 = UNLOCK KEY
*  ***********************************************************
  CASE j = 85
    SELECT b
    number = 0
    SET COLOR TO
    @ 24,0 CLEAR TO 24,80
    SET COLOR TO &ucolor
    @ 24,3 SAY 'Enter Door Number : ' GET number PICTURE '99' RANGE 1,16
    READ
    num = LTRIM(STR(number,2))
    LOCATE FOR doornumber = number
*
    IF status = 'X'
      SET COLOR TO
      @ 24,0 CLEAR TO 24,80
      SET COLOR TO &mcolor
      @ 23,1 SAY SPACE(0)
      WAIT "   Door "+num+" Is Unused. It Can't Be Unlocked.  PRESS ENTER."
    ELSE
      REPLACE status WITH 'U'
      COMMIT
      SAVE SCREEN TO screens[1]
      doorchg = number
      deviceno = 5
      on_off = "OFF"
      DO XMIT
      DO XMIT
      setscreen = .T.
      RESTORE SCREEN FROM screens[1]
*
      IF log = 'P'
        SET DEVICE TO PRINT
        r = PROW()
        @ r,1 SAY 'At '+SUBSTR(TIME(),1,5)+' door  '+num
        @ r,PCOL() + 1 SAY ' was unlocked at the keyboard'
        @ r,PCOL() + 1 SAY "on "+CDOW(DATE())+", "
        @ r,PCOL() SAY CMONTH(DATE())+STR(DAY(DATE()))
        @ r + 1,1 SAY ' '
        SET DEVICE TO SCREEN
      ELSE
        SELECT c
        message = 'At '+SUBSTR(TIME(),1,5)+' door  '+num+;
        ' was unlocked at the keyboard on ' + CDOW(DATE())+;
        ', ' + CMONTH(DATE())+STR(DAY(DATE()))
        APPEND BLANK
        REPLACE day WITH CDOW(DATE())
```

```
      REPLACE msg WITH message
      COMMIT
      SELECT b
    ENDIF
*
    IF number > 0 .AND. number < 9
      col = 6
      row = (number * 2 ) + 3
    ELSE
      col = 45
      row = ((number - 8 ) * 2 ) + 3
    ENDIF
    @ row,col SAY '#' + STR(number,2) + ' Unlked - ' + doordesc
  ENDIF
  SET COLOR TO &bcolor
  @ 22,17 SAY '(c) Copyright 1988,1989 Tri-State Telecomputers'
  @ 24,0 CLEAR TO 24,80
  SET COLOR TO &mcolor
  @ 24,4 SAY log
  @ 24,17 SAY 'Help Reset Lock Unlock Edit Schedule Print Off'
  SELECT a
*  ***********************************************************
*  69 = EDIT KEY
*  ***********************************************************
   CASE j = 69
  SET COLOR TO
  @ 24,0 CLEAR TO 24,80
  SET COLOR TO &mcolor
  correct = .F.
  password = '        '
  @ 24,3 SAY 'Enter Password'
  SET COLOR TO RB/RB,RB/RB
  @ 24,18 GET password PICTURE '@!'
  READ
  SET COLOR TO
  @ 24,0 CLEAR TO 24,80
  IF password <> 'DOOR    '
    @ 24,3 SAY 'Invalid Password - access '
    SET COLOR TO
    SET COLOR TO &lcolor
    @ 24,29 SAY 'DENIED'
    SET COLOR TO
    SET COLOR TO &mcolor
    @ 24,40 SAY 'Press any key to continue.'
    @ 24,0 CLEAR TO 24,80
  ELSE
    correct = .T.
  ENDIF
  IF correct = .F.
    SET COLOR TO &bcolor
    @ 22,17 SAY '(c) Copyright 1988,1989 Tri-State Telecomputers'
    @ 24,0 CLEAR TO 24,80
    SET COLOR TO &mcolor
    @ 24,4 SAY log
    @ 24,17 SAY 'Help Reset Lock Unlock Edit Schedule Print Off'
  ELSE
    SELECT b
    SET COLOR TO
    @ 24,0 CLEAR TO 24,80
    SET COLOR TO &mcolor
    door = 1
    @ 24,3 SAY 'Enter Door Number : ' GET door PICTURE '99' RANGE 1,16
    READ
    LOCATE FOR doornumber = door
    ans = ' '
    DO WHILE ans = ' '
      ans = 'C'
      SET COLOR TO
      @ 24,0 CLEAR TO 24,80
      SET COLOR TO &mcolor
      @ 24,3 SAY 'Do You Want To Add Change or Delete (A,C,D) : ' GET ans
      READ
      IF .NOT. UPPER(ans) $ 'A,C,D'
        ans = ' '
        LOOP
      ENDIF
    ENDDO
*
*
  IF status <> 'X' .AND. UPPER(ans) = 'A'
    SET COLOR TO
```

```
    @ 24,0 CLEAR TO 24,80
    SET COLOR TO &mcolor
    @ 23,1 SAY SPACE(0)
    WAIT "   Door "+STR(door,2)+" Is used. It Can't Be Added.  PRESS ENTER."
  ELSE
*
*
  IF status = 'X' .AND. UPPER(ans) = 'C'
    SET COLOR TO
    @ 24,0 CLEAR TO 24,80
    SET COLOR TO &mcolor
    @ 23,1 SAY SPACE(0)
    WAIT "   Door "+STR(door,2)+" Is Unused. It Can't Be Changed.  PRESS ENTER"
  ELSE
*
*
  IF status = 'X' .AND. UPPER(ans) = 'D'
    SET COLOR TO
    @ 24,0 CLEAR TO 24,80
    SET COLOR TO &mcolor
    @ 23,1 SAY SPACE(0)
    WAIT "   Door "+STR(door,2)+" Is Unused. It Can't Be Deleted.  PRESS ENTER"
  ELSE
*
*
          stat = ' '
          IF UPPER(ans) = 'A' .OR. UPPER(ans) = 'C'
            SET COLOR TO
            @ 24,0 CLEAR TO 24,80
            SET COLOR TO &mcolor
            IF UPPER(ans) = 'A'
              DO WHILE stat = ' '
                @ 24,3 SAY 'Lock or Unlock The Door : ' GET stat PICTURE '@!'
                READ
                IF .NOT. UPPER(stat) $ 'L,U'
                  stat = ' '
                  LOOP
                ENDIF
              ENDDO
              IF stat = 'L'
                REPLACE status WITH 'L'
                on_off = "ON"
              ELSE
                on_off = "OFF"
                REPLACE status WITH 'U'
              ENDIF
              doorchg = door
              deviceno = 5
              DO XMIT
              DO XMIT
              setscreen = .T.
            ENDIF
            desc = SPACE(19)
            @ 24,3 SAY 'Enter Door Description : ' GET desc PICTURE '@!'
            READ
            REPLACE doordesc WITH desc
          ELSE
            REPLACE status WITH 'X'
            REPLACE doordesc WITH SPACE(19)
          ENDIF
          COMMIT
          IF door < 9
            col = 6
            row = (door * 2 ) + 3
          ELSE
            row = ((door - 8 ) * 2 ) + 3
            col = 45
          ENDIF
          SET COLOR TO
          @ 24,0 CLEAR TO 24,80
          IF status = 'L'
            SET COLOR TO &lcolor
            @ row,col SAY '#' + STR(door,2) + ' Locked - ' + doordesc
          ELSE
            IF status = 'U'
              SET COLOR TO &ucolor
              @ row,col SAY '#' + STR(door,2) + ' Unlked - ' + doordesc
            ELSE
              SET COLOR TO &ncolor
              @ row,col SAY '#' + STR(door,2) + ' Unused - ' + doordesc
            ENDIF
```

```
          ENDIF
*
          IF log = 'P'
          SET DEVICE TO PRINT
          r = PROW()
          IF UPPER(ans) = 'A' .AND. stat = 'L'
            @ r,1 SAY 'At '+SUBSTR(TIME(),1,5)+' door '+STR(door,2)
            @ r,PCOL() + 1 SAY 'was added and set at LOCK'
            @ r,PCOL() + 1 SAY "on "+CDOW(DATE())+", "
            @ r,PCOL() SAY CMONTH(DATE())+STR(DAY(DATE()))
          ELSE
            IF UPPER(ans) = 'A' .AND. stat = 'U'
              @ r,1 SAY 'At '+SUBSTR(TIME(),1,5)+' door '+STR(door,2)
              @ r,PCOL() + 1 SAY 'was added and set at UNLOCK'
              @ r,PCOL() + 1 SAY "on "+CDOW(DATE())+", "
              @ r,PCOL() SAY CMONTH(DATE())+STR(DAY(DATE()))
            ELSE
              IF UPPER(ans) = 'C'
               @ r,1 SAY 'At '+SUBSTR(TIME(),1,5)+' door '+STR(door,2)
               @ r,PCOL() + 1 SAY 'description was changed to ' + desc
               r = PROW() + 1
               @ r,1 SAY "on "+CDOW(DATE())+", "
               @ r,PCOL() SAY CMONTH(DATE())+STR(DAY(DATE()))
              ELSE
               @ r,1 SAY 'At '+SUBSTR(TIME(),1,5)+' door '+STR(door,2)
               @ r,PCOL() + 1 SAY 'was DELETED'
               @ r,PCOL() + 1 SAY "on "+CDOW(DATE())+", "
               @ r,PCOL() SAY CMONTH(DATE())+STR(DAY(DATE()))
              ENDIF
            ENDIF
          ENDIF
          @ r + 1,1 SAY ' '
          SET DEVICE TO SCREEN
          ENDIF
*
*
          IF log = 'D'
            SELECT c
            IF UPPER(ans) = 'A' .AND. stat = 'L'
              message = 'At '+SUBSTR(TIME(),1,5)+' door '+STR(door,2)+;
              ' was added and set at LOCK on ' + CDOW(DATE()) + ', '+;
              CMONTH(DATE())+STR(DAY(DATE()))
            ELSE
              IF UPPER(ans) = 'A' .AND. stat = 'U'
                message = 'At '+SUBSTR(TIME(),1,5)+' door '+STR(door,2)+;
                ' was added and set at UNLOCK on ' + CDOW(DATE()) + ', '+;
                CMONTH(DATE())+STR(DAY(DATE()))
              ELSE
                IF UPPER(ans) = 'C'
                  message = 'At '+SUBSTR(TIME(),1,5)+' door '+STR(door,2)+;
                  ' description was changed to '+desc+' on '+CDOW(DATE())+', '+
                  CMONTH(DATE())+STR(DAY(DATE()))
                ELSE
                  message = 'At '+SUBSTR(TIME(),1,5)+' door '+STR(door,2)+;
                  ' was DELETED on ' + CDOW(DATE()) + ', '+;
                  CMONTH(DATE())+STR(DAY(DATE()))
                ENDIF
              ENDIF
            ENDIF
            APPEND BLANK
            REPLACE day WITH CDOW(DATE())
            REPLACE msg WITH message
            COMMIT
          ENDIF
*
          SELECT a
          GOTO TOP
  ENDIF
  ENDIF
  ENDIF
        ENDIF
        SET COLOR TO
        @ 24,0 CLEAR TO 24,80
        SET COLOR TO &bcolor
        @ 22,17 SAY '(c) Copyright 1988,1989 Tri-State Telecomputers'
        @ 24,0 CLEAR TO 24,80
        SET COLOR TO &mcolor
        @ 24,4 SAY log
        @ 24,17 SAY 'Help Reset Lock Unlock Edit Schedule Print Off'
***************************************************************
* RESET KEY: RESETS DOORS ACCORDING TO SCHEDULE
***************************************************************
```

```
        CASE j = 82
SELECT b
USE doordata
GOTO TOP
SELECT a
USE dtsdata
GOTO TOP
FOR i = 1 TO 140
  dtsarray[i] = dtsdatafld
  SKIP
NEXT
*  **************************************************************
*  SETUP OF THE POINTER TO THE FIRST SCHEDULED TIME
*  OF THE CURRENT DAY
*  **************************************************************
x = 1
found = .F.
DO WHILE .NOT. found
  IF SUBSTR(dtsarray[x],1,3) <> UPPER(SUBSTR(CDOW(DATE()),1,3))
    x = x + 20
  ELSE
    pointer = x
    page = x
    found = .T.
  ENDIF
ENDDO
*  **************************************************************
*  SEND OUT THE DOOR NUMBER TO THE "XMIT" PROGRAM WHICH
*  NEED TO BE LOCKED OR UNLOCKED
*  **************************************************************
SELECT b
GOTO TOP
abvdate = SUBSTR(CDOW(DATE()),1,3)
last = '99:99'
FOR i = 1 TO 16
    IF status <> 'X'
       doorno = i
       deviceno = 5
       if status = "U"
          on_off = "OFF"
          DO XMIT
          DO XMIT
       else
          on_off = "ON"
          DO XMIT
          DO XMIT
       endif
       GOTO doorno
       IF doorno > 0 .AND. doorno < 9
          row = (doorno * 2) + 3
          col = 6
       ELSE
          row = ((doorno - 8) * 2) + 3
          col = 45
       ENDIF
*      SET COLOR TO &bcolor
*      @ row,col CLEAR TO row, col + 32
*      SWDELAY(2)
*      RESTORE SCREEN FROM screens[1]
    ENDIF
    SKIP
NEXT
setscreen = .T.
*  **************************************************************
*  83 = SCHEDULE KEY
*  **************************************************************
    CASE j = 83
         SAVE SCREEN TO screens[1]
         DO schedule
         RESTORE SCREEN FROM screens[1]
*  **************************************************************
*  80 = PRINT DISKETTE LOG FILE PRINT KEY
*  **************************************************************
    CASE j = 80
         SAVE SCREEN TO screens[1]
         SET COLOR TO
         CLEAR
         changed = .T.
         changedtop = .F.
         word = SPACE(8)
```

```
IF log = 'P'
  @ 9,9 SAY 'The printer has already been selected to display each'
  @ 10,9 SAY 'action taken by the system.  If you would like to change'
  @ 11,9 SAY 'to the diskette log file, first place the diskette with'
  @ 12,9 SAY 'the log file into the "B" diskette drive. Second enter'
  @ 13,9 SAY 'your password. Leave the password blank and press enter'
  @ 14,9 SAY 'if you want to stay with the printer log file.'
  @ 15,9 SAY 'You will be returned to the doors display screen.'
  SET COLOR TO B/B,B/B
  @ 17,45 GET word PICTURE '@!'
  READ
  cnt = 1
  IF word = '          '
    RESTORE SCREEN FROM screens[1]
  ELSE
    cnt = 2
    DO WHILE cnt < 3 .AND. word <> 'DOOR      '
      @ 17,45 GET word PICTURE '@!'
      READ
      IF word <> 'DOOR      '
        cnt = cnt + 1
        LOOP
      ENDIF
    ENDDO
    IF cnt = 3 .AND. word <> 'DOOR      '
      SET COLOR TO
      CLEAR
      @ 14,10 SAY 'YOU HAVE TWICE ENTERED AN INCORRECT PASSWORD.'
      @ 15,10 SAY 'THE PRINTER LOG FILE WILL CONTINUE TO BE USED.'
      @ 17,10 SAY ' '
      WAIT '           Press any key to continue.'
    ENDIF
    IF log = 'P' .AND. word = 'DOOR      ' .AND. cnt < 3
      SELECT c
      USE a:log7days
      log = 'D'
    ENDIF
  ENDIF
ELSE
  ans = ' '
  DO WHILE ans = ' '
    ans = 'N'
    @ 10,5 SAY 'Would you like to cancel the printout and return to'
    @ 11,5 SAY 'the door display screen. (Y/N)'
    @ 11,36 GET ans PICTURE '@!'
    READ
    IF .NOT. ans $'Y,N'
      ans = ' '
      LOOP
    ENDIF
  ENDDO
  IF ans = 'N'
    changed = .F.
    CLEAR
    ans2 = ' '
    DO WHILE ans2 = ' '
      ans = 'N'
      @ 10,5 SAY 'After the diskette log file has printed, would you '
      @ 11,5 SAY 'like to change over to the printer log file. (Y/N)'
      @ 11,57 GET ans2 PICTURE '@!'
      READ
      IF .NOT. ans2 $'Y,N'
        ans = ' '
        LOOP
      ENDIF
    ENDDO
    IF ans2 = 'Y'
      CLEAR
      cnt = 1
      @ 12,25 SAY 'Enter your password.'
      DO WHILE cnt < 3 .AND. word <> 'DOOR      '
        CLEAR
        SET COLOR TO
        @ 12,25 SAY 'Enter your password.'
        @ 12,46 GET word PICTURE '@!'
        SET COLOR TO B/B,B/B
        READ
        IF word = 'DOOR      '
          SET COLOR TO
          CLEAR
```

```
      @ 14,5 SAY 'You have entered the correct password.'
      @ 15,5 SAY 'After the log file has printed you will'
      @ 16,5 SAY 'then be using the printer log file.'
      @ 18,10 SAY ' '
      WAIT '     Press any key to continue.'
      changedtop = .T.
    ELSE
      cnt = cnt + 1
      LOOP
    ENDIF
  ENDDO
  IF cnt = 3 .AND. word <> 'DOOR    '
    CLEAR
    @ 14,10 SAY 'YOU HAVE TWICE ENTERED AN INCORRECT PASSWORD.'
    @ 15,10 SAY 'THE DISKETTE LOG FILE WILL CONTINUE TO BE USED.'
    @ 17,10 SAY ' '
    WAIT '          Press any key to continue.'
  ENDIF
ENDIF
IF log = 'D' .AND. .NOT. changed
  CLEAR
  @ 14,10 SAY 'MAKE SURE THE PRINTER IS HOOKED UP AND TURNED ON.'
  @ 16,10 SAY ' '
  WAIT '          Press any key to continue.'
  CLEAR
  @ 15,10 SAY 'The Diskette Log File Is Now Printing.'
  SELECT c
  GOTO TOP
  SET DEVICE TO PRINT
  cnt = 0
  DO WHILE .NOT. EOF()
    IF cnt = 0 .OR. cnt = 60
      EJECT
      cnt = 0
      @ 2,5 SAY DATE()
      @ 2,26 SAY 'PRINTOUT OF THE DISKETTE LOG FILE'
      @ 2,72 SAY TIME()
      @ 4,2 SAY 'ACTION TAKEN  DESCRIPTION OF ACTION TAKEN'
      cnt = 6
    ENDIF
    IF UPPER(day) = 'MON'
      aday = 'MONDAY'
    ELSE
      IF UPPER(day) = 'TUE'
        aday = 'TUESDAY'
      ELSE
        IF UPPER(day) = 'WED'
          aday = 'WEDNESDAY'
        ELSE
          IF UPPER(day) = 'THU'
            aday = 'THURSDAY'
          ELSE
            IF UPPER(day) = 'FRI'
              aday = 'FRIDAY'
            ELSE
              IF UPPER(day) = 'SAT'
                aday = 'SATURDAY'
              ELSE
                IF UPPER(day) = 'SUN'
                 aday = 'SUNDAY'
                ENDIF
              ENDIF
            ENDIF
          ENDIF
        ENDIF
      ENDIF
    ENDIF
    @ cnt,4 SAY aday
    @ cnt,16 SAY SUBSTR(msg,1,60)
    cnt = cnt + 1
    @ cnt,16 SAY SUBSTR(msg,61,60)
    cnt = cnt + 1
    SKIP
  ENDDO
  @ cnt,80 SAY ' '
ENDIF
*  ***********************************************************
*  The printer log file was selected in the place of the
*  diskette log file.  The diskette log file database is
*  closed and is zapped after being printed.
*  ***********************************************************
```

```
*             IF log = 'D' .AND. ans2 = 'Y'
*               IF cnt < 3 .AND. word = 'DOOR    '
                IF changedtop
                  SET SAFETY OFF
                  ZAP
                  SET SAFETY ON
                  USE
                   log = 'P'
                 ENDIF
*              ENDIF
*  ************************************************************
*            ENDIF
           ENDIF
         ENDIF
         SET DEVICE TO SCREEN
         RESTORE SCREEN FROM screens[1]
*  ************************************************************
*  79 = UNLOCK ALL DOORS BEFORE TURNING OFF COMPUTER
*  ************************************************************
    CASE j = 79
        SAVE SCREEN TO screens[1]
        select b
        GOTO TOP
        FOR i = 1 TO 16
           IF status = 'L'
              doorchg = i
              deviceno = 5
              on_off = "OFF"
              DO XMIT
              DO XMIT
           ENDIF
           SKIP
        NEXT
             @ 10,20 CLEAR TO 16,62
             @ 12,24 SAY 'PRESS CTRL ALT C TO EXIT THE PROGRAM'
         Z = 00
         Z = INKEY(0)
         RESTORE SCREEN FROM screens[1]
         setscreen = .T.
         SELECT a
*  ************************************************************
*  70 = FIRE SIMULATION KEY
*  ************************************************************
*   CASE j = 70
*        SAVE SCREEN TO screens[1]
*        fire = 'ON '
*        SET COLOR TO &ucolor
*        SELECT b
*        GOTO TOP
*        FOR y = 1 TO 16
*          IF UPPER(status) = 'L'
*            doorchg = y
*            deviceno = 5
*            on_off = "OFF"
*            DO XMIT
*            setscreen = .T.
*          ENDIF
*          SKIP
*        NEXT
*        GOTO TOP
*        row = 5
*        col = 6
*        doornum = 1
*        DO WHILE doornum < 17
*          IF UPPER(status) <> 'X'
*             @ row,col SAY '#' + STR(doornum,2) + '  fire ' + ' - ' + doordesc
*          ENDIF
*          row = row + 2
*          doornum = doornum + 1
*          IF doornum = 9
*            row = 5
*            col = 45
*          ENDIF
*          SKIP
*        ENDDO
*        SAVE SCREEN TO screens[2]
*        SET COLOR TO
*        FOR a = 1 TO 30
*            CLEAR
*            TONE(493.90, 9)
*            RESTORE SCREEN FROM screens[2]
*            TONE(246, 9)
```

```
*       NEXT
*       GOTO TOP
*       fire = 'OFF'
*       RESTORE SCREEN FROM screens[1]
*       FOR y = 1 TO 16
*           IF UPPER(status) = 'L'
*             doorchg = y
*             deviceno = 5
*             on_off = "ON"
*             DO XMIT
*             DO XMIT
*             setscreen = .T.
*           ENDIF
*           SKIP
*       NEXT
*
   OTHERWISE
      RXFLUSH(1)
*


*
  ENDCASE
*
  SELECT a
*
  IF abvdate <> SUBSTR(CDOW(DATE()),1,3)
    abvdate = SUBSTR(CDOW(DATE()),1,3)
*
    IF log = 'D'
     SELECT c
      GOTO TOP
      DELETE FOR day = abvdate
      PACK                                                        19.
    ENDIF
*
    SELECT a
    IF pointer = 121
      pointer = 1
    ELSE
      pointer = pointer + 20
    ENDIF
  ENDIF
  do_update = .F.
  p = 1
  x = pointer
  DO WHILE SUBSTR(TIME(),1,5) >= SUBSTR(dtsarray[x],4,5) .AND. p < 21
    x = x + 1
    p = p + 1
  ENDDO
  IF p = 21
    x = x - 1
  ENDIF
  IF SUBSTR(dtsarray[x],4,5) <> '99:99' .AND. p = 21
    IF last <> SUBSTR(dtsarray[x],4,5)
      do_update = .T.
      last = SUBSTR(dtsarray[x],4,5)
    ENDIF
  ELSE
    IF SUBSTR(dtsarray[x],4,5) = '99:99' .AND. p > 1
      x = x - 1
      IF last <> SUBSTR(dtsarray[x],4,5)
        do_update = .T.
        last = SUBSTR(dtsarray[x],4,5)
      ENDIF
    ELSE
      IF SUBSTR(dtsarray[x],4,5) <> '99:99' .AND. p > 1
        x = x - 1
        IF last <> SUBSTR(dtsarray[x],4,5)
          do_update = .T.
          last = SUBSTR(dtsarray[x],4,5)
        ENDIF
      ELSE
        IF SUBSTR(dtsarray[x],4,5) <> '99:99' .AND. p = 1
          IF last <> SUBSTR(dtsarray[x],4,5) .AND.;
          SUBSTR(dtsarray[x],4,5) <= SUBSTR(TIME(),1,5)
            do_update = .T.
            last = SUBSTR(dtsarray[x],4,5)
          ENDIF
        ENDIF
      ENDIF
    ENDIF
  ENDIF
```

```
IF do_update
  doors = SUBSTR(dtsarray[x],9,20)
  SELECT b
  GOTO TOP
  FOR y = 1 TO 16
    IF UPPER(SUBSTR(doors,y,1)) <> 'X' .AND. UPPER(SUBSTR(doors,y,1)) <> statu
    .AND. UPPER(status) <> 'X'
     REPLACE status WITH SUBSTR(doors,y,1)
      SAVE SCREEN TO screens[1]
      doorchg = y
      deviceno = 5
      if status = "L"
         on_off = "ON"
      else
         on_off = "OFF"
      endif
      DO XMIT
      DO XMIT
      setscreen = .T.
      RESTORE SCREEN FROM screens[1]
   ENDIF
   SKIP
  NEXT
  TONE(246, 9)
  TONE(246, 9)
  COMMIT
*
*   IF log = 'P'
*     SET DEVICE TO PRINT
*     r = PROW()
*     @ r,1 SAY 'At '+SUBSTR(TIME(),1,5)+' the scheduled '
*     @ r,PCOL() SAY 'time change of '+abvdate+ ' ' + last
*     r = PROW() + 1
*     @ r,1 SAY 'has been completed on '+ CDOW(DATE()) + ', '
*     @ r,PCOL() SAY CMONTH(DATE())+STR(DAY(DATE()))
*     @ r + 1,1 SAY ' '
*     SET DEVICE TO SCREEN
*   ELSE
*     SELECT c
*     message = 'At '+SUBSTR(TIME(),1,5)+' the scheduled time change of '+;
*     abvdate + ' ' + last + ' has been completed on ' + CDOW(DATE())+;
*     ', ' + CMONTH(DATE())+STR(DAY(DATE()))
*     APPEND BLANK
*     REPLACE day WITH CDOW(DATE())
*     REPLACE msg WITH message
*     COMMIT
*     SELECT b
*   ENDIF
*
  ENDIF
*
*
  SELECT b
* RXFLUSH(1)
  out_string = "UR1"
  TXSTRING(1,out_string)
  TXCHAR(1,CHR(13))
  out_string = "R"
  TXSTRING(1,out_string)
  TXCHAR(1,CHR(13))
  TXSTRING(1,out_string)
  TXCHAR(1,CHR(13))
  SWDELAY(42)
  STORE .F. TO recv_done
  STORE ""  TO in_string
  DO WHILE .NOT. recv_done
     IF RXEMPTY(1)
        STORE .T. TO recv_done
        LOOP
     ENDIF


     STORE 1 TO byte_cnt
     DO WHILE byte_cnt < 5
        IF RXEMPTY(1)
           STORE 5 TO byte_cnt
           STORE .T. TO recv_done
           LOOP
        ELSE
           in_char = CHR(RXCHAR(port))
        ENDIF
```

```
         IF byte_cnt = 1
            lettercode = in_char
            IF lettercode < "A" .OR. lettercode > "P"
               byte_cnt = 1
               LOOP
            ENDIF
            doorno = ASC(lettercode) - 64
            byte_cnt = 2
            LOOP
         ENDIF

         IF byte_cnt = 2
            dcode1 = in_char
            byte_cnt = 3
            LOOP
         ENDIF

         IF byte_cnt = 3
            dcode2 = in_char
            STORE dcode1 + dcode2 TO in_string
            devicecode = VAL(in_string)
            byte_cnt = 4
            LOOP
         ENDIF

         IF byte_cnt = 4
            funcode = in_char
            IF funcode = "O"
               STORE "ON"  to on_off
            ELSE
               STORE "OFF" to on_off
            ENDIF
            byte_cnt = 5
         ENDIF
      ENDDO
      IF recv_done
         LOOP
      ENDIF
*
* PANIC BUTTON
*
      DO CASE
         CASE devicecode = 2
              doorchg = doorno
              GOTO doorno
              IF doorno > 0 .AND. doorno < 9
                 row = (doorno * 2) + 3
                 col = 6
              ELSE
                 row = ((doorno - 8) * 2) + 3
                 col = 45
              ENDIF

              IF on_off = "ON"
                 deviceno = 6
                 on_off = "ON"
                 DO XMIT
                 DO XMIT
                 on_off = "OFF"
                 DO XMIT
                 DO XMIT
                 TONE(493.9,9)
                 SET COLOR TO &ucolor
                 @ row,col SAY '#' + STR(doorno,2) + ' Panic '+' - '+doordesc
                 TONE(246,9)
                 ? CHR(7)
                 IF log = 'D'
                    SELECT c
                    message = 'At '+SUBSTR(TIME(),1,5)+' door '+str(doorno,2)+;
                              ' was unlocked by the panic bar on ' + CDOW(DATE())
                              ', ' + CMONTH(DATE())+STR(DAY(DATE()))
                    APPEND BLANK
                    REPLACE day WITH CDOW(DATE())
                    REPLACE msg WITH message
                    COMMIT
                    SELECT b
                 ELSE
                    SET DEVICE TO PRINT
                    r = PROW()
                    @ r,1 SAY 'At '+SUBSTR(TIME(),1,5)+' door '+str(doorno,2)
```

```
            @ r,PCOL() + 1 SAY ' was unlocked by the panic bar'
            @ r,PCOL() + 1 SAY "on "+CDOW(DATE())+", "
            @ r,PCOL() SAY CMONTH(DATE())+STR(DAY(DATE()))
            @ r + 1,1 SAY ' '
            SET DEVICE TO SCREEN
         ENDIF
      ELSE
         deviceno = 6
         on_off = "ON"                                          23.
         DO XMIT
         DO XMIT
         on_off = "OFF"
         DO XMIT
         DO XMIT
         REPLACE status with "L"
         COMMIT
         SET COLOR TO &lcolor
         @ row,col SAY '#' + STR(doorno,2) + ' Locked '+'- '+doordesc
         ? CHR(7)
      ENDIF

*
* KEY LOCK
*
   CASE devicecode = 3
      doorchg = doorno
      GOTO doorno
      IF doorno > 0 .AND. doorno < 9
         row = (doorno * 2) + 3
         col = 6
      ELSE
         row = ((doorno - 8) * 2) + 3
         col = 45
      ENDIF
      IF on_off = "ON"
         deviceno = 6
         on_off = "ON"
         DO XMIT
         DO XMIT
         on_off = "OFF"
         DO XMIT
         DO XMIT
         SET COLOR TO &ucolor
         @ row,col SAY '#' + STR(doorno,2) + ' Keylk '+' - '+doordesc
         FOR A = 1 TO 2
            TONE(246,9)
            TONE(493.9,9)
         NEXT
         IF log = 'D'
            SELECT c
            message = 'At '+SUBSTR(TIME(),1,5)+' door '+str(doorno,2)+;
                      ' was unlocked by key on ' + CDOW(DATE())+;
                      ', ' + CMONTH(DATE())+STR(DAY(DATE()))
            APPEND BLANK
            REPLACE day WITH CDOW(DATE())
            REPLACE msg WITH message
            COMMIT
            SELECT b
         ELSE
            SET DEVICE TO PRINT
            r = PROW()
            @ r,1 SAY 'At '+SUBSTR(TIME(),1,5)+' door '+str(doorno,2)
            @ r,PCOL() + 1 SAY ' was unlocked by key'
            @ r,PCOL() + 1 SAY "on "+CDOW(DATE())+", "          24.
            @ r,PCOL() SAY CMONTH(DATE())+STR(DAY(DATE()))
            @ r + 1,1 SAY ' '
            SET DEVICE TO SCREEN
         ENDIF
         REPLACE status with "L"
         COMMIT
         SET COLOR TO &lcolor
      ELSE
         deviceno = 6
         on_off = "ON"
         DO XMIT
         DO XMIT
         on_off = "OFF"
         DO XMIT
         DO XMIT
         ? CHR(7)
```

```
            SET COLOR TO &lcolor
            @ row,col SAY '#' + STR(doorno,2) + ' Locked '+'- '+doordesc
         ENDIF

*
* FIRE ALARM HAS SOUNDED
*
      CASE doorno = 1 .AND. devicecode = 16
         fire = 'ON'
         SAVE SCREEN TO screens[1]
         SET COLOR TO &ucolor
         GOTO TOP
         FOR y = 1 TO 16
            IF UPPER(status) = 'L'
               doorchg = y
               deviceno = 5
               on_off = "OFF"
               DO XMIT
            ENDIF
            SKIP
         NEXT
         SET COLOR TO
         @ 10,20 CLEAR TO 16,66
         @ 12,24 SAY 'ALL DOORS HAVE BEEN UNLOCKED. PLEASE WAIT'
         GOTO TOP
         FOR y = 1 TO 16
            IF UPPER(status) = 'L'
               doorchg = y
               deviceno = 5
               on_off = "OFF"
               DO XMIT
               DO XMIT
               setscreen = .T.
            ENDIF
            SKIP
         NEXT
         fatime = SUBSTR(TIME(),1,5)
         GOTO TOP
         row = 5
         col = 6
         doornum = 1
         DO WHILE doornum < 17     *
            IF UPPER(status) <> 'X'
           @ row,col SAY '#' + STR(doornum,2) + '  fire ' + ' - ' + doordesc
            ENDIF
            row = row + 2
            doornum = doornum + 1
            IF doornum = 9
               row = 5
               col = 45
            ENDIF
            SKIP
         ENDDO
         SET COLOR TO
         @ 10,20 CLEAR TO 16,66
         @ 12,24 SAY 'ALL DOORS HAVE BEEN UNLOCKED. PLEASE WAIT'
         IF log = 'D'
            SELECT c
         message = 'The fire alarm sounded at '+fatime+' on '+CDOW(DATE())+;
                  ', ' + CMONTH(DATE())+STR(DAY(DATE()))+'.'+;
                  ' All doors were unlocked.'
            APPEND BLANK
            REPLACE day WITH CDOW(DATE())
            REPLACE msg WITH message
            COMMIT
            SELECT b
         ELSE
            SET DEVICE TO PRINT
            r = PROW()
            @ r,1 SAY 'At ' + fatime + ' All doors'
            @ r,PCOL() + 1 SAY ' were unlocked by the fire alarm'
            @ r,PCOL() + 1 SAY "on "+CDOW(DATE())+", "
            @ r,PCOL() SAY CMONTH(DATE())+STR(DAY(DATE()))
            @ r + 1,1 SAY ' '
            SET DEVICE TO SCREEN
         ENDIF
         SAVE SCREEN TO screens[2]
         FOR a = 1 TO 104
            @ 2,1 SAY SPACE(0)
            RESTORE SCREEN FROM screens[2]
*           ? CHR(7)
```

```
                FOR b = 1 TO 20
                    b = b + 1
                    b = b - 1
                NEXT
            NEXT
            SET COLOR TO
            @ 10,20 CLEAR TO 16,66
            @ 12,24 SAY 'PRESS CTRL/F10 AFTER THE FIRE ALARM HAS'
            @ 13,24 SAY 'BEEN RESET.  THE DOORS WILL REVERT BACK'
            @ 14,24 SAY 'TO THEIR PREVIOUS STATUS.'
            Z = 00
            Z = INKEY(0)
***  CLEAR THE RECEIVE BUFFER
            devicecode = 15
            out_string = "UX"
            out_string = "UR0"
            TXSTRING(1,out_string)
            TXCHAR(1,CHR(13))
            out_string = "R"
            TXSTRING(1,out_string)
            TXCHAR(1,CHR(13))
            TXSTRING(1,out_string)
            TXCHAR(1,CHR(13))
            SWDELAY(42)
            STORE .T. TO recv_done
            out_string = "UR1"
***
*
            RESTORE SCREEN FROM screens[1]
            GOTO TOP
            fire = 'OFF'
            setonalarm = .F.
            FOR y = 1 TO 16
                IF UPPER(status) <> 'X'
                   doorchg = y
                   deviceno = 5
                   IF status = "L"
                      on_off = "ON"
                   ELSE
                      on_off = "OFF"
                   ENDIF
                   DO XMIT
                   DO XMIT
                   setscreen = .T.
                ENDIF
                SKIP
            NEXT
*
       CASE devicecode = 1
           IF on_off = "ON"
              rtrn = 'U'
           ELSE
              rtrn = 'L'
           ENDIF
           IF doorno > 0 .AND. doorno < 9
              col = 6
              row = (doorno * 2 ) + 3
           ELSE
              col = 45
              row = ((doorno - 8 ) * 2 ) + 3
           ENDIF
           doorchg = doorno
           GOTO doorno
           IF on_off = "ON"
              IF status = 'L'
                 deviceno = 6
                 on_off = "ON"
                 DO XMIT
                 DO XMIT
                 on_off = "OFF"
                 DO XMIT
                 DO XMIT
                 SET COLOR TO &acolor
                 @ row,col SAY '#' + STR(doorno,2) + ' Ajar  ' + ' - ' + doorde
                 SAVE SCREEN TO screens[2]
                 FOR CNT = 1 TO DOORNO
                    @ 2,1 SAY SPACE(0)
                    RESTORE SCREEN FROM screens[2]
                    ? CHR(7)
```

```
              NEXT
              IF log = 'D'
                 SELECT c
                 message = 'At '+SUBSTR(TIME(),1,5)+' door '+str(doorno,2)+;
                           ' was ajar ' + CDOW(DATE())+;
                           ', ' + CMONTH(DATE())+STR(DAY(DATE()))
                 APPEND BLANK
                 REPLACE day WITH CDOW(DATE())
                 REPLACE msg WITH message
                 COMMIT
                 SELECT b
              ELSE
                 SET DEVICE TO PRINT
                 r = PROW()
                 @ r,1 SAY 'At '+SUBSTR(TIME(),1,5)+' door '+str(doorno,2)
                 @ r,PCOL() + 1 SAY ' was ajar'
                 @ r,PCOL() + 1 SAY "on "+CDOW(DATE())+", "
                 @ r,PCOL() SAY CMONTH(DATE())+STR(DAY(DATE()))
                 @ r + 1,1 SAY ' '
                 SET DEVICE TO SCREEN
              ENDIF
           ENDIF
        ELSE
*            IF status = "U"
              deviceno = 6
              on_off = "ON"
              DO XMIT
              DO XMIT
              on_off = "OFF"
              DO XMIT
              DO XMIT
              ? CHR(7)
              SET COLOR TO &lcolor
              @ row,col SAY '#' + STR(doorno,2) + ' Locked '+'- '+doordesc
              IF log = 'D'
                 SELECT c
                 message = 'At '+SUBSTR(TIME(),1,5)+' door '+str(doorno,2)+;
                           ' relocked ' + CDOW(DATE())+;
                           ', ' + CMONTH(DATE())+STR(DAY(DATE()))
                 APPEND BLANK
                 REPLACE day WITH CDOW(DATE())
                 REPLACE msg WITH message
                 COMMIT
                 SELECT b
              ELSE
                 SET DEVICE TO PRINT
                 r = PROW()
                 @ r,1 SAY 'At '+SUBSTR(TIME(),1,5)+' door '+str(doorno,2)
                 @ r,PCOL() + 1 SAY ' relocked'
                 @ r,PCOL() + 1 SAY "on "+CDOW(DATE())+", "
                 @ r,PCOL() SAY CMONTH(DATE())+STR(DAY(DATE()))
                 @ r + 1,1 SAY ' '
                 SET DEVICE TO SCREEN
              ENDIF
*            ENDIF
        ENDIF
* OTHERWISE - ACKNOWLEDGE ON DEVICECODE = 4
     CASE devicecode = 4
        doorchg = doorno
        GOTO doorno
        IF doorno > 0 .AND. doorno < 9
           row = (doorno * 2) + 3
           col = 6
        ELSE
           row = ((doorno - 8) * 2) + 3
           col = 45
        ENDIF

*       IF on_off = "ON"
           SET COLOR TO &bcolor
           @ row,col CLEAR  TO row, col + 32
           SWDELAY(2)
           setscreen = .T.
*          RESTORE SCREEN FROM screens[1]
*       ENDIF
     ENDCASE
  ENDDO
ENDDO
***********   SCHEDULE.PRG FOR 16 DOORS  6-5-90
SET TALK OFF
SET DEVICE TO SCREEN
CLEAR
```

```
*
*
* DECLARE dtsarray[140]
SELECT a
*
SET COLOR TO
@ 0,0 CLEAR TO 24,80
*
* pointer = 1
SET COLOR TO &bcolor
daytime = abvdate + SUBSTR(TIME(),1,5)
@ 1,5 SAY daytime
@ 1,14 SAY ' 1  2  3  4  5  6  7  8  9  10 11 12 13 14 15 16'
@ 2,4,23,63 BOX single
*
pointer2 = pointer
row = 3
col = 8
FOR p = pointer TO pointer + 19
  @ row,col SAY SUBSTR(dtsarray[p],4,5)
  row = row + 1
NEXT
*
row = 3
col = 14
FOR p = pointer TO pointer + 19
  x = 9
  DO WHILE x <> 25
    IF SUBSTR(dtsarray[p],x,1) = 'L'
      SET COLOR TO &lcolor
      @ row,col SAY ' L '
    ELSE
      IF SUBSTR(dtsarray[p],x,1) = 'U'
        SET COLOR TO &ucolor
        @ row,col SAY ' U '
      ELSE
        SET COLOR TO &ncolor
        @ row,col SAY  ' x '
      ENDIF
    ENDIF
    x = x + 1
    col = col + 3
  ENDDO
  row = row + 1
  col = 14
NEXT
*
SET COLOR TO &mcolor
@ 24,4 SAY 'Valid keys -- Help  '
@ 24,24 SAY ''
@ 24,26 SAY '-><-  PgUp  PgDn  Ins  Del  U-L-C  End'
*
@ 3,15 SAY SPACE(0)
*
done = .F.
DO WHILE .NOT. done
*
  i = 00
  i = INKEY(20)
*
  IF i = 00
    GOTO TOP
    FOR i = 1 TO 140
      REPLACE dtsdatafld WITH dtsarray[i]
      SKIP
    NEXT
    pointer = pointer2
    RETURN
  ENDIF
*
  IF i = 99
    i = 67
  ELSE
    IF i = 108
      i = 76
    ELSE
      IF i = 117
        i = 85
      ELSE
        IF i = 104
          i = 72
```

```
          ELSE
            IF i = 101 .OR. i = 69
              i = 6
            ENDIF
          ENDIF
        ENDIF
      ENDIF
    ENDIF
    DO CASE
      CASE i = 5
           IF row() <= 3
             col = COL()
             ?? CHR(7)
           ELSE
             @ ROW() - 1,COL() SAY SPACE(0)
           ENDIF
      CASE i = 24
           IF row() >= 22
             col = COL()
             ?? CHR(7)
           ELSE
             @ ROW() + 1,COL() SAY SPACE(0)
           ENDIF
      CASE i = 4
           IF col() >= 60
             col = COL()
             ?? CHR(7)
           ELSE
             @ ROW(),COL() + 3 SAY SPACE(0)
           ENDIF
      CASE i = 19
           IF col() <= 15
             col = COL()
             ?? CHR(7)
           ELSE
             @ ROW(),COL() - 3 SAY SPACE(0)
           ENDIF
      CASE i = 18
           IF pointer = 1
             pointer = 121
           ELSE
             pointer = pointer - 20
           ENDIF
*
           SET COLOR TO
           SET COLOR TO &bcolor
           daytime = SUBSTR(dtsarray[pointer],1,3) + SUBSTR(TIME(),1,5)
           @ 1,5 SAY daytime
           @ 1,14 SAY ' 1  2  3  4  5  6  7  8  9  10 11 12 13 14 15 16'
*
           row = 3
           col = 8
           FOR p = pointer TO pointer + 19
             @ row,col SAY SUBSTR(dtsarray[p],4,5)
             row = row + 1
           NEXT
*
           row = 3
           col = 14
           FOR p = pointer TO pointer + 19
             x = 9
             DO WHILE x <> 25
               IF SUBSTR(dtsarray[p],x,1) = 'L'
                 SET COLOR TO &lcolor
                 @ row,col SAY ' L '
               ELSE
                 IF SUBSTR(dtsarray[p],x,1) = 'U'
                   SET COLOR TO &ucolor
                   @ row,col SAY ' U '
                 ELSE
                   SET COLOR TO &ncolor
                     @ row,col SAY ' x '
                 ENDIF
               ENDIF
               x = x + 1
               col = col + 3
             ENDDO
             row = row + 1
             col = 14
           NEXT
```

```
          @ 3,15 SAY SPACE(0)
     CASE i = 3
          IF pointer = 121
            pointer = 1
          ELSE
            pointer = pointer + 20
          ENDIF
*
          SET COLOR TO
          SET COLOR TO &bcolor
          daytime = SUBSTR(dtsarray[pointer],1,3) + SUBSTR(TIME(),1,5)
          @ 1,5 SAY daytime
          @ 1,14 SAY ' 1  2  3  4  5  6  7  8  9  10 11 12 13 14 15 16'
*
          row = 3
          col = 8
          FOR p = pointer TO pointer + 19
            @ row,col SAY SUBSTR(dtsarray[p],4,5)
            row = row + 1
          NEXT
*
          row = 3
          col = 14
          FOR p = pointer TO pointer + 19
            x = 9
            DO WHILE x <> 25
              IF SUBSTR(dtsarray[p],x,1) = 'L'
                SET COLOR TO &lcolor
                @ row,col SAY ' L '
              ELSE
                IF SUBSTR(dtsarray[p],x,1) = 'U'
                  SET COLOR TO &ucolor
                  @ row,col SAY ' U '
                ELSE
                  SET COLOR TO &ncolor
                    @ row,col SAY ' x '
                ENDIF
              ENDIF
              x = x + 1
              col = col + 3
            ENDDO
            row = row + 1
            col = 14
          NEXT
          @ 3,15 SAY SPACE(0)
     CASE i = 22
          row = 3
          notcorrect = .T.
          correct = .F.
          x = pointer
          DO WHILE x < pointer + 20 .AND. SUBSTR(dtsarray[x],4,5) <> '99:99'
            row = row + 1
            x = x + 1
          ENDDO
          IF x = pointer + 20
            SET COLOR TO &mcolor
            @ 24,0 CLEAR TO 24,80
            @ 23,0 SAY SPACE(0)
WAIT 'ONE TIME MUST BE DELETED BEFORE ADDING NEW TIME. PRESS ENTER TO CONTINUE.'
            SET COLOR TO
            @ 24,0 CLEAR TO 24,79
            SET COLOR TO &mcolor
            @ 24,4 SAY 'Valid keys --.Help  '
            @ 24,24 SAY ''
            @ 24,26 SAY '-><-  PgUp  PgDn  Ins  Del  U-L-C  End'
          ELSE
            DO WHILE .NOT. correct
              SET COLOR TO &bcolor
              newtime = '     '
              @ row,8 GET newtime PICTURE '!!:!!'
              READ
              IF VAL(SUBSTR(newtime,1,2)) > 23 .OR. VAL(SUBSTR(newtime,4,2))>59;
              .OR. asc(SUBSTR(newtime,1,1))>57 .OR. asc(SUBSTR(newtime,2,1))>57;
              .OR. asc(SUBSTR(newtime,4,1))>57 .OR. asc(SUBSTR(newtime,5,1))>57
                SET COLOR TO &mcolor
                @ 24,0 CLEAR TO 24,79
                @ 23,1 SAY SPACE(0)
                WAIT 'YOU HAVE ENTERED AN INVALID TIME. PRESS ENTER TO CONTINUE.'
                SET COLOR TO
                @ 24,0 CLEAR TO 24,79
```

```
          SET COLOR TO &mcolor
          @ 24,4 SAY 'Valid keys -- Help  '
          @ 24,24 SAY ''
          @ 24,26 SAY '-><-  PgUp  PgDn  Ins  Del  U-L-C  End'
          LOOP
        ELSE
          notcorrect = .F.
          y = pointer
          DO WHILE y < pointer + 20
            IF newtime = SUBSTR(dtsarray[y],4,5) .AND. x <> y
              SET COLOR TO &mcolor
              @ 24,0 CLEAR TO 24,79
              @ 23,1 SAY SPACE(0)
         WAIT 'YOU HAVE ENTERED A DUPLICATE TIME. PRESS ENTER TO CONTINUE.'
              SET COLOR TO
              @ 24,0 CLEAR TO 24,79
              SET COLOR TO &mcolor
              @ 24,4 SAY 'Valid keys -- Help  '
              @ 24,24 SAY ''
              @ 24,26 SAY '-><-  PgUp  PgDn  Ins  Del  U-L-C  End'
              notcorrect = .T.
            ENDIF
            y = y + 1
          ENDDO
        ENDIF
        IF notcorrect
          correct = .F.
        ELSE
          correct = .T.
        ENDIF
      ENDDO
  dtsarray[x] = SUBSTR(dtsarray[x],1,3) + newtime + SUBSTR(dtsarray[x],9,30)
      IF log = 'P'
        SET DEVICE TO PRINT
        r = PROW()
        c = 1
        @ r,c SAY SUBSTR(dtsarray[x],1,3)+ " " +newtime+' was added on'
        c = PCOL() + 2
@ r,c SAY CDOW(DATE())+', '+CMONTH(DATE())+STR(DAY(DATE()))
        @ r + 1,1 SAY ' '
        SET DEVICE TO SCREEN
      ELSE
        SELECT c
        message = SUBSTR(dtsarray[x],1,3)+ ' ' +newtime+' was added on '+;
        CDOW(DATE())+', '+CMONTH(DATE())+STR(DAY(DATE()))
        APPEND BLANK
        REPLACE day WITH CDOW(DATE())
        REPLACE msg WITH message
        SELECT a
      ENDIF
    ENDIF
*
    ASORT(dtsarray,pointer,20)
*
    SET COLOR TO
    @ 0,0 CLEAR TO 24,79
    SET COLOR TO &bcolor
    daytime = SUBSTR(dtsarray[pointer],1,3) + SUBSTR(TIME(),1,5)
    @ 1,5 SAY daytime
    @ 1,14 SAY ' 1  2  3  4  5  6  7  8  9  10 11 12 13 14 15 16'
    @ 2,4,23,63 BOX single
*
    row = 3
    col = 8
    FOR p = pointer TO pointer + 19
      @ row,col SAY SUBSTR(dtsarray[p],4,5)
      row = row + 1
    NEXT
*
    row = 3
    col = 14
    FOR p = pointer TO pointer + 19
      x = 9
      DO WHILE x <> 25
        IF SUBSTR(dtsarray[p],x,1) = 'L'
          SET COLOR TO &lcolor
          @ row,col SAY ' L '
        ELSE
          IF SUBSTR(dtsarray[p],x,1) = 'U'
            SET COLOR TO &ucolor
            @ row,col SAY ' U '
```

```
            ELSE
              SET COLOR TO &ncolor
                @ row,col SAY ' x '
            ENDIF
          ENDIF
          x = x + 1
          col = col + 3
        ENDDO
        row = row + 1
        col = 14
      NEXT
*
      SET COLOR TO &mcolor
      @ 24,4 SAY 'Valid keys -- Help  '
      @ 24,24 SAY ''
      @ 24,26 SAY '-><-  PgUp  PgDn  Ins  Del  U-L-C  End'
*
      IF correct
        row = 3
        y = pointer
        DO WHILE newtime <> SUBSTR(dtsarray[y],4,5)
          row = row + 1
          y = y + 1
        ENDDO
        @ row,15 SAY SPACE(0)
      ELSE
        @ 3,15 SAY SPACE(0)
      ENDIF
  CASE i = 7
      SET COLOR TO &bcolor
      @ ROW(),8 SAY '99:99'
      x = ROW() - 3 + pointer
      SET COLOR TO &ncolor
      col = 14
      DO WHILE col < 61
        @ ROW(),col SAY ' x '
        col = col + 3
      ENDDO
      IF log = 'P'
        SET DEVICE TO PRINT
        r = PROW()
        c = 1
        @ r,c SAY SUBSTR(dtsarray[x],1,8) + ' was deleted on'
        c = PCOL() + 2
        @ r,c SAY CDOW(DATE())+', '+CMONTH(DATE())+STR(DAY(DATE()))
        r = r + 1
        c = 1
@ r,c SAY '==> Door statuses of deleted time: ' + SUBSTR(dtsarray[x],9,8)+;
' '+SUBSTR(dtsarray[x],17,8)
        @ r + 2,1 SAY ' '
        SET DEVICE TO SCREEN
      ELSE
        SELECT c
        message = SUBSTR(dtsarray[x],1,3)+ ' '+;
        SUBSTR(dtsarray[x],4,5)+ ' '+ 'was deleted on '+;
        CDOW(DATE())+', '+CMONTH(DATE())+STR(DAY(DATE()))+;
        '  ==> Door statuses of deleted time: ' + SUBSTR(dtsarray[x],9,8)+;
        ' ' + SUBSTR(dtsarray[x],17,8)
        APPEND BLANK
        REPLACE day WITH CDOW(DATE())
        REPLACE msg WITH message
        SELECT a
      ENDIF
      dtsarray[x] = SUBSTR(dtsarray[x],1,3)+'99:99XXXXXXXXXXXXXXXX'
      @ ROW(),15 SAY SPACE(0)
      ASORT(dtsarray,pointer,20)
*
      SET COLOR TO
      SET COLOR TO &bcolor
      daytime = SUBSTR(dtsarray[pointer],1,3) + SUBSTR(TIME(),1,5)
      @ 1,5 SAY daytime
      @ 1,14 SAY ' 1  2  3  4  5  6  7  8  9  10 11 12 13 14 15 16'
*
      row = 3
      col = 8
      FOR p = pointer TO pointer + 19
        @ row,col SAY SUBSTR(dtsarray[p],4,5)
        row = row + 1
      NEXT
*
```

```
        row = 3
        col = 14
        FOR p = pointer TO pointer + 19
          x = 9
          DO WHILE x <> 25
            IF SUBSTR(dtsarray[p],x,1) = 'L'
              SET COLOR TO &lcolor
              @ row,col SAY ' L '
            ELSE
              IF SUBSTR(dtsarray[p],x,1) = 'U'
                SET COLOR TO &ucolor
                @ row,col SAY ' U '
              ELSE
                SET COLOR TO &ncolor
                  @ row,col SAY ' x '
              ENDIF
            ENDIF
            x = x + 1
            col = col + 3
          ENDDO
          row = row + 1
          col = 14
        NEXT
*
        SET COLOR TO &mcolor
        @ 24,4 SAY 'Valid keys -- Help  '
        @ 24,24 SAY ''
        @ 24,26 SAY '-><-  PgUp  PgDn  Ins  Del  U-L-C  End'
        @ 3,15 SAY SPACE(0)
*
    CASE i = 85
        IF col() >= 61
          col = COL()
          ?? CHR(7)
        ELSE
          x = ROW() - 3 + pointer
          SET COLOR TO
          SET COLOR TO &ucolor
          ans = ((COL() + 3 - 15) / 3)
          ans2 = ans
          ans2 = LTRIM(STR(ans2,2))
          p = ans + 8
          @ ROW(),COL() - 1 SAY ' U '
*
          IF log = 'P'
            SET DEVICE TO PRINT
            r = PROW()
            c = 1
@ r,c SAY SUBSTR(dtsarray[x],1,8)+', door '+ans2+': Schedule changed to unlock'
            c = PCOL() + 1
            @ r,c SAY "on "+CDOW(DATE())+", "
            @ r,PCOL() SAY CMONTH(DATE())+STR(DAY(DATE()))
            @ r + 1,1 SAY ' '
            SET DEVICE TO SCREEN
          ELSE
            SELECT c
            message = SUBSTR(dtsarray[x],1,8)+', door '+ans2+;
            ': Schedule changed to unlock on ' + CDOW(DATE()) + ', '+;
            CMONTH(DATE())+STR(DAY(DATE()))
            APPEND BLANK
            REPLACE day WITH CDOW(DATE())
            REPLACE msg WITH message
            SELECT a
          ENDIF
*
 dtsarray[x] = SUBSTR(dtsarray[x],1,p - 1)+'U'+SUBSTR(dtsarray[x],p + 1,38 - p)
          IF col() >= 61
            col = COL()
            ?? CHR(7)
            @ ROW(),COL() - 2 SAY SPACE(0)
          ELSE
            @ ROW(),COL() + 1 SAY SPACE(0)
          ENDIF
        ENDIF
    CASE i = 76
        IF col() >= 61
          col = COL()
          ?? CHR(7)
        ELSE
          x = ROW() - 3 + pointer
          SET COLOR TO &lcolor
```

```
            ans = ((COL() + 3 - 15) / 3)
            ans2 = ans
            ans2 = LTRIM(STR(ans2,2))
            p = ans + 8
            @ ROW(),COL() - 1 SAY ' L '
*
            IF log = 'P'
              SET DEVICE TO PRINT
              r = PROW()
              c = 1
@ r,c SAY SUBSTR(dtsarray[x],1,8)+', door '+ans2+': Schedule changed to lock'
              c = PCOL() + 1
              @ r,c SAY "on "+CDOW(DATE())+", "
              @ r,PCOL() SAY CMONTH(DATE())+STR(DAY(DATE()))
              @ r + 1,1 SAY ' '
              SET DEVICE TO SCREEN
            ELSE
              SELECT c
              message = SUBSTR(dtsarray[x],1,8)+', door '+ans2+;
              ': Schedule changed to lock on ' + CDOW(DATE()) + ', '+;
              CMONTH(DATE())+STR(DAY(DATE()))
              APPEND BLANK
              REPLACE day WITH CDOW(DATE())
              REPLACE msg WITH message
              SELECT a
            ENDIF
*
 dtsarray[x] = SUBSTR(dtsarray[x],1,p - 1)+'L'+SUBSTR(dtsarray[x],p + 1,38 - p)
            IF col() >= 61
              col = COL()
              ?? CHR(7)
              @ ROW(),COL() - 2 SAY SPACE(0)
            ELSE
              @ ROW(),COL() + 1 SAY SPACE(0)
            ENDIF
          ENDIF
     CASE i = 67
          IF col() >= 61
            col = COL()
            ?? CHR(7)
          ELSE
            x = ROW() - 3 + pointer
            SET COLOR TO &ncolor
            ans = ((COL() + 3 - 15) / 3)
            ans2 = ans
            ans2 = LTRIM(STR(ans2,2))
            p = ans + 8
            @ ROW(),COL() - 1 SAY ' x '
*
            IF log = 'P'
              SET DEVICE TO PRINT
              r = PROW()
              c = 1
@ r,c SAY SUBSTR(dtsarray[x],1,8)+', door '+ans2+': Schedule cleared to "X"'
              c = PCOL() + 1
              @ r,c SAY "on "+CDOW(DATE())+", "
              @ r,PCOL() SAY CMONTH(DATE())+STR(DAY(DATE()))
              @ r + 1,1 SAY ' '
              SET DEVICE TO SCREEN
            ELSE
              SELECT c
              message = SUBSTR(dtsarray[x],1,8)+', door '+ans2+;
              ': Schedule cleared to "X" on ' + CDOW(DATE()) + ', '+;
              CMONTH(DATE())+STR(DAY(DATE()))
              APPEND BLANK
              REPLACE day WITH CDOW(DATE())
              REPLACE msg WITH message
              SELECT a
            ENDIF
*
 dtsarray[x] = SUBSTR(dtsarray[x],1,p - 1)+'X'+SUBSTR(dtsarray[x],p + 1,38 - p)
            IF col() >= 61
              col = COL()
              ?? CHR(7)
              @ ROW(),COL() - 2 SAY SPACE(0)
            ELSE
              @ ROW(),COL() + 1 SAY SPACE(0)
            ENDIF
          ENDIF
     CASE i = 6
```

```
          GOTO TOP
          FOR i = 1 TO 140
            REPLACE dtsdatafld WITH dtsarray[i]
            SKIP
          NEXT
          pointer = pointer2
          RETURN
     CASE i = 72
          SAVE SCREEN TO screens[2]
          SET COLOR TO
          @ 0,0 CLEAR TO 24,80
          @ 4,13 SAY 'This is the automatic time clock which controls the exits.'
          @ 5,13 SAY 'The last CRT line displays the valid keyboard commands.'
          @ 6,13 SAY 'Just press "H" for help, any of the directional arrows, or'
          @ 7,13 SAY 'the key with the desired command on it.'
          @ 9,13 SAY 'Help - prints this massage'
          @ 10,13 SAY '-><- moves the cursor one position in that direction'
          @ 11,13 SAY 'PgUp - displays the previous days times'
          @ 12,13 SAY 'PgDn - displays the next days times'
          @ 13,13 SAY 'Ins - insert a new time'
          @ 14,13 SAY "Del - delete a time along with its door indicators"
          @ 15,13 SAY 'U - unlock a door'
          @ 16,13 SAY 'L - lock a door'
          @ 17,13 SAY "C - the door's previous condition is unchanged"
          @ 18,13 SAY 'End - returns you to the door status screen'
          SET COLOR TO &mcolor
          @ 21,27 SAY 'PRESS ANY KEY TO CONTINUE'
          SET COLOR TO
          WAIT ' '
          RESTORE SCREEN FROM screens[2]
          @ 3,15 SAY SPACE(0)
   ENDCASE
 ENDDO
*** XMIT.PRG

STORE "UT1" TO OUT_STRING
TXSTRING(1,OUT_STRING)
TXCHAR(1,CHR(13))
SWDELAY(delay)
lettercode = CHR(doorchg + 64)
DO CASE
   CASE DEVICENO = 1
        STORE "01" TO UNIT_CODE
   CASE DEVICENO = 2
        STORE "02" TO UNIT_CODE
   CASE DEVICENO = 3
        STORE "03" TO UNIT_CODE
   CASE DEVICENO = 4
        STORE "04" TO UNIT_CODE
   CASE DEVICENO = 15
        STORE "15" TO UNIT_CODE
   CASE DEVICENO = 16
        STORE "16" TO UNIT_CODE
ENDCASE
IF on_off = "ON"
   STORE "O" TO FUNCODE
ELSE
   STORE "F" TO FUNCODE
***
ENDIF
STORE "WH" + lettercode + UNIT_CODE + FUNCODE TO OUT_STRING
TXSTRING(1,OUT_STRING)
TXCHAR(1,CHR(13))
SWDELAY(delay)
*@ 23,30 SAY lettercode
*@ 23,36 SAY deviceno
*@ 23,41 SAY on_off
```

What is claimed is:

1. A method of controlling and monitoring locks at multiple door sites wherein each door is equipped with an electro-locking device and each site has at least one system control unit comprised of at at least one transmitting device uniquely addressed per site and at least one receiving device uniquely addressed per site wherein said locking device is wired to said system control unit and necessary AC-DC transformer(s) are used with devices and of monitoring the activation of the fire alarm which is equipped with at least one transmitting device uniquely addressed and a coupler/-repeater/amplifier, using a computer wherein said equipped doors, said fire alarm and said computer use same AC transformer or coupled transformers, said computer having a memory and a means of maintaining the time and date, at least one display screen, a means (usually a keyboard) for selecting items from said screen, a means to output data (usually a printer and/or a floppy disk drive), an interface with the AC power line in which said interface has memory to store transmissions and receipts, said method comprising the steps of:

(a) storing in said memory 1) doordata file comprising number, name or location and status of each door;

2) schedule comprising the predetermined status of each door at various times of various days;

3) door changes comprising time, date, location, means of change (Key, panic bar, keyboard, etc);

4) transmissions received from the door transmitters via said interface;

5) the software executable program;

(b) allowing a user to change said doordata, said schedule, said output means via said means to select items from said screen;

(c) executing an ongoing process including 1) resetting door status if said schedule indicates time change;

2) taking received transmissions of door changes from said interface and performs multiple operations accordingly to provide adequate monitoring;

3) taking received transmissions of fire alarm transmitter from said interface and unlocks all said equipped doors;

4) displaying said status of said equipped door sites on said screen where statuses include at least the following: locked, unlocked, door ajar (lock activated, but door not locked), key override, other override;

5) continually monitoring for said keyboard input that can i. change said status of any said equipped door;

ii. edit data in said doordata file;

iii. set or alter said schedule;

iv. provide on-screen help to execute said program;

v. change the said output means or initiate output;

2. A computerized system for controlling and monitoring of electro-locking devices at multiple monitored sites including existing AC power lines which operate from same transformer or coupled transformers;

a monitoring station including a computer and computer program to control and monitor locking devices and including a power line interface connecting computer and said power lines, wherein power line interface includes transmitting and receiving means to handle communications between the computer and the monitored sites;

at each monitored site, a system control unit connected to said power lines and including transmitting and receiving means to communicate with said monitoring station wherein said system control unit selectively controls the status of each of said electro-locking devices according to a schedule selected at said monitoring station.

an electro-locking device with sensor capabilities and wired to to said system control unit;

at least one lock by-pass means, and wired to system control unit to monitor its use and to allow egress.

3. A system according to claim 2 including a transmitting means wired to fire alarm panel and operating from said AC power lines.

4. A system according to claim 3 including phone notification means in said computer at monitoring station and including active phone lines connected to said computer wherein computer dials and delivers a message for remote monitoring.

5. A method of controlling the status of doors in a building having multiple door sites and existing AC power lines extending to each door site, said method comprising the steps of:

providing an electric locking system at each door site including transmitting and receiving means;

connecting each said locking system to said AC power ines of building;

providing a monitoring station within said building including transmitting and receiving means; and connecting said monitoring station transmitting and receiving means to said AC power lines of said building to enable the transmitting means of said monitoring station to communicate over said existing AC power lines with said receiving means of said locking systems and to enable transmitting means of said locking systems to communicate over said AC power lines with said receiving means of said monitoring station.

6. A method according to claim 5 wherein the building includes a fire alarm system and wherein the method includes the further steps of providing a transmitting means at the fire alarm system site and electrically connecting said transmitting means at the fire alarm system site with said receiving means of the locking systems so that a fire alarm signal may be transmitted to the receiving means at each door site to actuate the locking systems in a sense to unlock the doors.

7. A method according to claim 6 wherein the transmitting means at the fire alarm system site is electrically connected to the receiving means at said monitoring station so that a fire alarm signal may be transmitted to receiving means of said monitoring station for transmittal to the receiving means at each door site to actuate the locking systems in a sense to unlock the doors.

* * * * *